United States Patent
Khurana et al.

(10) Patent No.: US 11,379,644 B1
(45) Date of Patent: Jul. 5, 2022

(54) IC CHIP TEST ENGINE

(71) Applicant: Cadence Design Systems, Inc., San Jose, CA (US)

(72) Inventors: Rajesh Khurana, Noida (IN); Divyank Mittal, Uttar Pradesh (IN); Sagar Kumar, Uttarakhand (IN); Vivek Chickermane, Slaterville Springs, NY (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/064,406

(22) Filed: Oct. 6, 2020

(51) Int. Cl.
| | |
|---|---|
| *G06F 30/333* | (2020.01) |
| *G06Q 50/18* | (2012.01) |
| *G06F 30/31* | (2020.01) |
| *G06F 16/903* | (2019.01) |
| *G06Q 10/06* | (2012.01) |
| *G06F 115/08* | (2020.01) |

(52) U.S. Cl.
CPC ...... *G06F 30/333* (2020.01); *G06F 16/90335* (2019.01); *G06F 30/31* (2020.01); *G06Q 10/06395* (2013.01); *G06Q 50/184* (2013.01); *G06F 2115/08* (2020.01)

(58) Field of Classification Search
CPC ...... G06F 30/31; G06F 30/333; G06F 50/184; G06F 16/90335; G06F 2115/08; G06Q 10/06395

See application file for complete search history.

(56) References Cited

U.S. PATENT DOCUMENTS

| | | | |
|---|---|---|---|
| 7,925,941 B2 | 4/2011 | Bhatia | |
| 10,996,271 B1* | 5/2021 | Weinraub | ....... G01R 31/318588 |
| 2005/0273685 A1* | 12/2005 | Sachdev | ............... G06F 11/263 |
| | | | 714/742 |
| 2008/0235550 A1* | 9/2008 | Yamada | ........... G01R 31/31919 |
| | | | 714/738 |

(Continued)

OTHER PUBLICATIONS

S. Gupta, A. Crouch, J. Dworak and D. Engels, "Increasing IJTAG bandwidth and managing security through parallel locking-SIBs," 2017 IEEE International Test Conference (ITC), 2017, pp. 1-10, doi: 10.1109/TEST.2017.8242034. (Year: 2017).*

(Continued)

*Primary Examiner* — Jack Chiang
*Assistant Examiner* — Aric Lin
(74) *Attorney, Agent, or Firm* — Tarolli, Sundheim, Covell & Tummino LLP

(57) ABSTRACT

An IC chip test engine selects an instrument of an IC design based on an instrument access script, wherein the selected instrument comprises an IP block and a test data register (TDR) logically arranged upstream from the IP block. The IC chip test engine can also identify a set of SIBs gating access to the selected instrument and select a scan chain for operating the set of SIBs to control access to the selected instrument. The IC chip test engine augments the scan chain with data to cause at least a furthest downstream SIB of the set of SIBs that gates access to the selected instrument to transition to an opened state. The IC chip test engine can generate a set of load vectors for the scan chain to load the TDR of the selected instrument with data to apply a respective test pattern to the IP block.

20 Claims, 12 Drawing Sheets

(56) References Cited

U.S. PATENT DOCUMENTS

2014/0005992 A1* 1/2014 Deindl .................. G06F 30/331
703/4

OTHER PUBLICATIONS

F. G. Zadegan, E. Larsson, A. Jutman, S. Devadze and R. Krenz-Baath, "Design, Verification, and Application of IEEE 1687," 2014 IEEE 23rd Asian Test Symposium, 2014, pp. 93-100, doi: 10.1109/ATS.2014.28. (Year: 2014).*

Yassine Fkih, et al., "2D to 3D Test Pattern Retargeting using IEEE P1687 based 3D DFT Architectures".

A. S. Shelja, et al., "Design of IEEE 1149.1 TAP Controller IP Core", Natarajan Meghanathan et al. (Eds) : ACITY, VLSI, AIAA, CNDC—2016, pp. 107-118, 2016.

IEEE P1687 Internal JTAG (IJTAG) Tutorial, Asset Driving Embedded Instrumentation, 2011.

Saurabh Gupta, et al., "Increasing IJTAG Bandwidth and Managing Security through Parallel Locking-SIBs", Paper 10.1 International Test Conference, 2017.

* cited by examiner

IC CHIP TEST ENGINE

TECHNICAL FIELD

This disclosure relates to an integrated circuit (IC) chip test engine.

BACKGROUND

In electronic design a semiconductor intellectual property (IP) block, or IP core is a reusable unit of logic, cell or IC chip layout design that is the IP of one party. IP cores may be licensed to another party or can be owned and used by a single party alone. IP cores can be used as building blocks within application-specific integrated circuit (ASIC) designs, field-programmable gate array (FPGA) logic designs or general-purpose processors.

Semiconductor manufacturers have embedded instruments in integrated circuit (IC) chips to simplify the characterization, testing and debugging of these devices. Given the right standards-based tools environment, these same instruments can perform a much broader spectrum of chip, board and system level validation, test and debug applications.

Several conditions in the electronics industry are motivating a trend toward embedded instrumentation and thereby have created a need for the Institute for Electrical and Electronics Engineers (IEEE) P1687 Internal Joint Action Group (IJTAG) standard. For circuit designs, the progress of advanced technologies such as complex microprocessors and very high-speed buses has outstripped the capabilities of the older legacy validation and test equipment. By and large, this legacy equipment is intrusive in that it is external to the circuit being tested and it relies upon placing a physical probe on some sort of an access point on the circuit or on a chip. For a number of reasons, the effective availability of these access points is rapidly diminishing and this is reducing the validation and test coverage that can be achieved with legacy intrusive testers, such as oscilloscopes and logic analyzers for validation, and in-circuit test (ICT) and manufacturing defect analyzers (MDA) for production testing. Thus, the testing of circuits with external, intrusive instrumentation has become increasingly less effective, the industry has turned to non-intrusive software-based embedded instrumentation which executes out of hardware on the circuit being test and is not limited by physical probes.

SUMMARY

One example relates to a non-transitory machine-readable medium having machine-readable instructions, the machine-readable instructions includes an IC chip test engine that selects an instrument of an IC design based on an instrument access script, wherein the selected instrument comprises an IP block and a test data register (TDR) logically arranged upstream from the IP block. The IC chip test engine can identify a set of segment insertion bits (SIBs) gating access to the selected instrument and select a scan chain for operating the set of SIBs to control access to the selected instrument. The IC chip test engine can augment the scan chain with data to cause at least a furthest downstream SIB of the set of SIBs that gates access to the selected instrument to transition to an opened state. The IC chip test engine can further generate a set of load vectors for the scan chain to load the TDR of the selected instrument with data to apply a respective test pattern to the IP block of the selected instrument, wherein a last load vector of the set of load vectors includes data to transition the furthest downstream SIB of the set of SIBs that gates access to the selected instrument to a closed state.

Another example relates to a system that can include a non-transitory memory that stores machine-readable instructions and a processing unit that accesses the memory and executes the machine-readable instructions. The machine-readable instructions can include an IC chip test engine that selects an instrument of an IC design based on an instrument access script, wherein the selected instrument includes an IP block and a TDR logically arranged upstream from the IP block. The IC chip test engine can identify a set of SIBs gating access to the selected instrument and select a scan chain for operating the set of SIBs to control access to the selected instrument. The IC chip test engine can also augment the scan chain with data to cause at least a furthest downstream SIB of the set of SIBs that gates access to the selected instrument to transition to an opened state. The IC chip test engine can further generate a set of load vectors for the scan chain to load the TDR of the selected instrument with data to apply a respective test pattern to the IP block of the selected instrument. A last load vector of the set of load vectors can include data to transition the furthest downstream SIB of the set of SIBs that gates access to the selected instrument to a closed state.

Yet another example relates to a method for testing an IC chip implemented by an IC chip test engine executing on a computing platform. The method can include selecting a test algorithm based on architecture data characterizing a layout of an IC chip corresponding to an IC design and instrument access script characterizing operations executed during a test of the IC chip corresponding to the IC design. The method can also include selecting an instrument in the IC design for testing. The selected instrument can include an IP block and a TDR logically arranged upstream from the IP block. The method can further include selecting a scan chain for operating a set of SIBs to control access to the selected instrument. The method can still further include augmenting the scan chain with data to cause at least a furthest downstream SIB of the set of SIBs that gates access to the selected instrument to transition to an opened state. The method can yet further include generating a set of load vectors for the scan chain to load the TDR of the selected instrument with data to apply a respective test pattern to the IP block of the selected instrument. A last load vector of the set of load vectors can include data to transition the furthest downstream SIB of the set of SIBs that gates access to the selected instrument to a closed state. The method can also include executing the scan chain to test the IC chip corresponding to the IC design.

DETAILED DESCRIPTION

Figure 1:
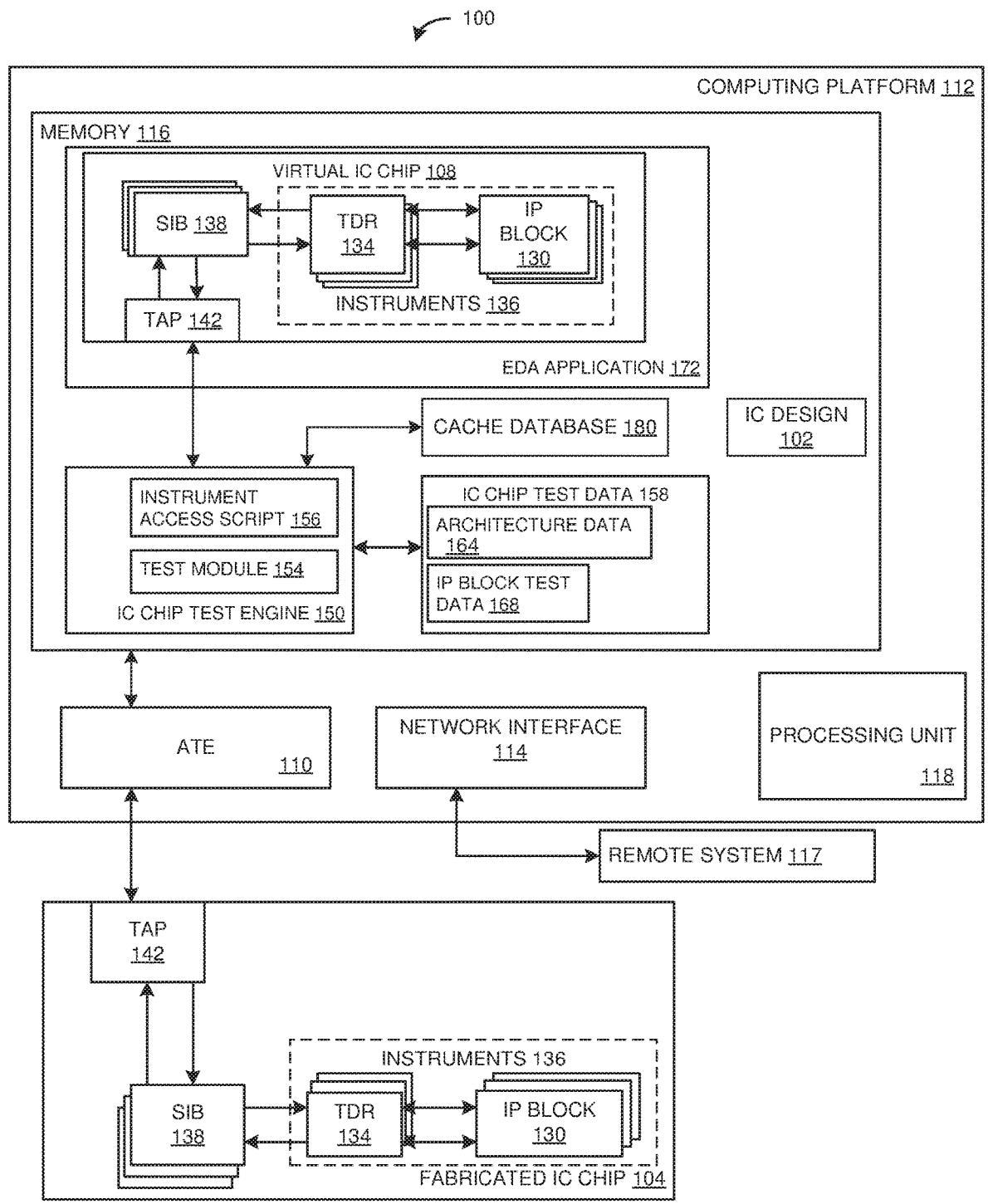
FIG. 1 illustrates an example of a system for executing an IC chip test engine on an IC chip corresponding to an IC design.

This disclosure relates to systems and methods for executing a test of an IC design implemented as a virtual IC chip or a fabricated IC chip. A computing platform can execute an IC chip test engine (e.g., a software application or a software module) that implements the test of the IC chip. The IC design can include a plurality of instruments, wherein each instrument includes an IP block that is downstream from a corresponding TDR. The computing platform can store IC chip test data and an instrument access script that defines an order of tests in the IP blocks of instruments in the IC design. In different examples, the instrument access script can indicate that the same instrument is to be tested once, multiple times consecutively or multiple times non-consecutively.

The IC chip test engine can analyze the instrument access script and architecture data of the IC chip test data to determine a correspondence and preconditioning of pins between the chip level and the IP block level for each IP block included in the instrument access script. The IC chip test engine selects a test algorithm, from a first test algorithm, a second test algorithm and a third test algorithm based on the analysis executed.

As described in detail herein, the first test algorithm can be selected in situations where one SIB in the IC design needs to be transitioned to the opened state and then to the closed state while executing operations on the instruments in the instrument access script are completed and the instrument access script indicates that multiple test patterns are not provided to the same instrument consecutively. The second test algorithm can be selected by the IC chip test engine in situations where the instrument access script indicates that access to multiple consecutive test patterns are needed to test a particular IP block of a particular instrument, and the particular instrument has one SIB gating access thereto. The third test algorithm can be selected in situations where the instrument access script indicates that one or more test patterns are needed to test a particular IP block of a particular instrument, and the architecture data indicates the particular instrument has multiple gating SIBs, which in turn indicates that the particular instrument is accessible via a furthest downstream (e.g., deepest nested) SIB gating access to the selected instrument.

The IC chip test engine selects a first instrument for testing that is identified in the instrument access script, which is referred to as a selected instrument. The IC chip test engine can identify a set of SIBs (one or more SIBs) that gate access to the selected instrument. The IC chip test engine can generate a scan chain for the selected instrument that employs the selected algorithm. The scan chain includes load vectors that, upon execution causes a furthest downstream SIB gating access to the selected instrument to transition to an opened state for testing an IP block of the selected instrument and to transition to a closed state after the testing is completed. Depending on the algorithm selected, the scan chain may include load vectors to change a state of other SIBs as well. The IC chip test engine can execute the scan chain and can record results (e.g., a response to the scan chain) for the selected instrument. The IC chip test engine can then select a next instrument identified in the test access script for testing and execute a test in a similar manner until the testing is complete.

FIG. 1 illustrates an example of a system 100 for testing an IC design 102 that could be implemented as a fabricated IC chip 104 or as a virtual IC chip 108. The system 100 can include a computing platform 112. Accordingly, the computing platform 112 can include a memory 116 for storing machined readable instructions and data and a processing unit 118 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 118 can be implemented as one or more processor cores. The computing platform 112 can include a network interface 114 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 118, the network interface 114, and the memory 116 could be representative of a single instance of hardware or multiple instances of hardware with applications executing across the multiple of instances (i.e., distributed) of hardware (e.g., computers, routers, memory, processors, or a combination thereof). Alternatively, the computing platform 112 could be implemented on a single dedicated server or workstation.

The IC design 102 can be stored in the memory 116 of the computing platform 112. The IC design 102 can be implemented, for example, as design specifications for an IC chip. The IC design 102 can be generated with an electronic design automation (EDA) application operating on a remote system 117, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 102.

In the examples described, the fabricated IC chip 104 represents a physically instantiated version of the IC design 102. Additionally, the virtual IC chip 108 represents a simulated instantiation of the IC design 102. Thus, features of the virtual IC chip 108 and the fabricated IC chip 104 employ the same reference numbers.

More particularly, the virtual IC chip 108 and the fabricated IC chip 104 can include IP blocks 130 that are illustrated as being arranged in a stack. While FIG. 1 illustrates three IP blocks 130, in many instances, there can be virtually any number of IP blocks (e.g., hundreds, thousands or millions). The IP blocks 130 can represent a logic block that executes a particular function. Each IP block 130 or some subset thereof can be provided for example, by a third-party developer or could be designed by the end-user that generated the IC design 102. In some examples, internal operations of some (or all) of the IP blocks 130 are known to the end-user. In other examples, such internal operations some (or all) of the IP blocks 130 are obfuscated.

Each IP block 130 is coupled to a TDR 134 (logically positioned) upstream of the IP block 130. The TDR 134 can be commanded to provide stimuli to the IP block 130 and to record a response from the IP block 130. Collectively, a TDR 134 and a downstream IP block 130 can be referred to as an instrument 136. A SIB 138 upstream of the TDR 134 gates access to the TDR 134 and the IP block 130. The SIB 138 selectively enables or disables access to embedded instruments (e.g., the TDR 134 and the IP block 130) by dynamically reconfiguring a scan chain and adding (or removing) a scan segment to or from an active scan path. In some examples, a single TDR 134 is downstream from a single SIB 138, in other examples, there could be multiple TDRs 134 downstream from a single SIB 138. The SIB 138 can conform to the standards set forth in the IEEE P1687 standard.

A test access port (TAP) 142 coupled upstream from the SIB 138 can provide an interface for external systems to provide stimuli to the components of the IC chip. The TAP 142 can conform to the standards set forth in the IEEE 1149.1 standards.

The memory 116 includes an IC chip test engine 150 which can be implemented as application software or a software module. The IC chip test engine 150 is configured to execute a test on the virtual IC chip 108 and/or the fabricated IC chip 104 to ensure proper operation. More particularly, the IC chip test engine 150 applies stimuli to the virtual IC chip 108 or the fabricated IC chip 104 and records and/or examines a response to determine if the IC design 102 implemented by the virtual IC chip 108 or the fabricated IC chip 104 is providing an expected response.

The IC chip test engine 150 can include an instrument access script 156 that defines commands for tests of the IP blocks 130 of the instruments and an order of such tests. The instrument access script 156 can be provided, for example, by the remote system 117 (e.g., in response to user input). The instrument access script 156 can indicate that the same instrument 136 is to be tested once, multiple times consecutively or multiple times non-consecutively.

The IC chip test engine 150 can include a test module 154 that can employ the IC chip test data 158 and the instrument access script 156 to determine a scan chain for testing a selected instrument 136 of the IC design 102 instantiated with the virtual IC chip 108 or the fabricated IC chip 104. The selected instrument 136 can be extracted from the instrument access script 156. The IC chip test data 158 can include architecture data 164 characterizing a logical layout of the IC chip implemented by the IC design 102 or the fabricated IC chip 104. More particularly, the architecture data 164 can identify a type of each IP block (e.g., the IP block 130) employed in the IC design 102. Additionally, as noted in some examples, there can be a single SIB 138 that controls access to multiple TDRs 134 and IP blocks 130. The architecture data 164 can characterize the logical layout of each such SIB 138, TDR 134 and IP block 130. The IC chip test data 158 can also include IP block test data 168. The IP block test data 168 can be supplied by a designer of the IP block 130. The IP block test data 168 can include test patterns formed of a list of stimuli and expected responses for the stimuli.

The scan chain generated by the test module 154 can generate commands in the JTAG protocol for testing the IC design 102 instantiated by the virtual IC chip 108 or the fabricated IC chip 104. In some examples, the scan chain generated by the test module 154 can be provided to an EDA application 172. The EDA application 172 can provide an environment to simulate operation of the IC design 102, such that the virtual IC chip 108 can be instantiated. The EDA application 172 can interface with the IC chip test engine 150 to execute a test on the virtual IC chip 108. More particularly, the commands in the scan chain provided by the IC chip test engine 150 (via the test module 154) can be applied to the TAP 142 of the virtual IC chip 108. Responses to the commands can be returned to the IC chip test engine 150, wherein the test module 154 can record and/or examine the responses to determine if the virtual IC chip 108 is operating properly.

Similarly, the IC chip test engine 150 can interface with the fabricated IC chip 104 via automatic test equipment (ATE) 110 that can alternatively be referred to as an IC chip tester or an IC chip tester machine. More particularly, the scan chain can be provided to ATE 110. The ATE can be implemented as a hardware device that is electrically coupled to pins on the fabricated IC chip 104. In the examples illustrated, such pins can be coupled to the TAP 142 of the fabricated IC chip 104. Thus, in response to the scan chain, the ATE 110 can provide electrical signals characterizing the scan chain to the TAP 142 of the fabricated IC chip 104 and provide responses back to the test module 154. The test module 154 can record and/or evaluate the responses to the scan chain to determine if the fabricated IC chip 104 is operating properly.

The scan chain can be employed to test operations of a given instrument 136. The scan chain generated by the test module 154 of the IC chip test engine 150 can vary considerably based on the architecture of the IC design 102 instantiated by the virtual IC chip 108 or the fabricated IC chip 104. The scan chain includes a test pattern for a given IP block 130 that is implemented as a series of stimuli (e.g., test data) and measure data (response data) at a boundary of the given IP block 130 or a given TDR 134 of a given instrument 136. The test pattern can be implemented in the procedural description language (PDL). The test module 154 extracts a set of corresponding pins at the chip level boundary that can be used to control input pins to the corresponding instrument 136 (e.g., pins of the given TDR 134 and the given IP block 130). Similarly, output pins of the instrument 136 that can be used to observe the data from the given IP block 130 are also identified by the test module 154.

To control and observe the pins of the given IP block 130 from their corresponding pins at the chip level, a clear path is established between the pins of the instrument 136 and the corresponding chip level pins (e.g., pins on the fabricated IC chip 104 or the virtual IC chip 108). To achieve this, a set of non-controlling values are applied at intermediate logic of the scan chain that allows this correspondence to be established.

Figure 2:
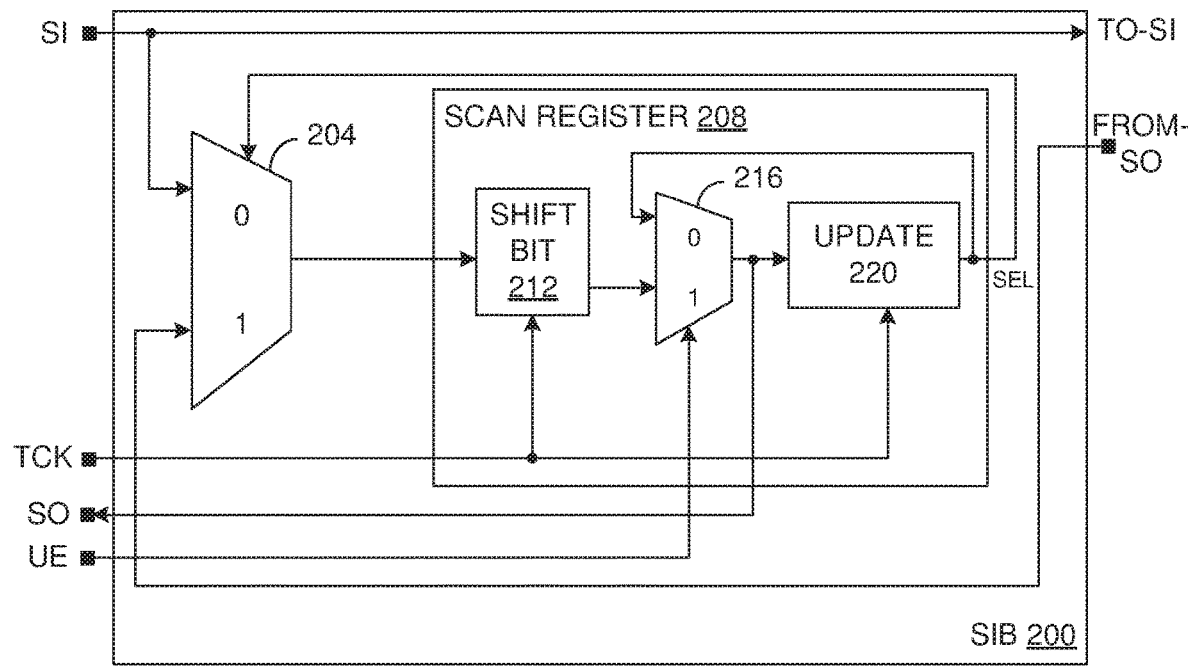
FIG. 2 illustrates a diagram for a segment insertion bit (SIB).

To demonstrate the functionality of the scan chain, FIG. 2 illustrates an example of a SIB 200 that could be employed to implement an instance of a SIB 138 of FIG. 1. The SIB 200 includes a first multiplexor (MUX) 204. The first MUX 204 is a two-input MUX. A first input (labeled '0' in FIG. 2) is coupled to a scan in pin, labeled "SI" of the SIB 200. Depending on the architecture of the IC chip, the pin providing the scan in pin, SI can be coupled to a TAP (e.g., the TAP 142 of FIG. 1, a TDR (e.g., the TDR 134 of FIG. 1) or another SIB.

The scan chain signal provided on the scan in pin, SI is also provided to a downstream scan in pin, labeled "TO-SI" in FIG. 2. The downstream scan in pin, TO-SI can be coupled to a downstream component. The downstream component could be, for example, a TDR or another SIB. A second input (labeled "1" in FIG. 2) of the first MUX 204 is coupled to a scan out return pin, labeled "FROM-SO" provided on a pin of the SIB 200. The return scan out return pin, FROM-SO can be coupled to a TDR or another SIB.

An output of the first MUX 204 is coupled to a scan register 208. More particularly, the output of the first MUX 204 is coupled to a shift bit register 212 of the scan register 208. The shift bit register 212 is controlled by a clock signal, labeled "TCK" that is provided to a pin of the SIB 200. The output of the shift bit register 212 is coupled to a second input (labeled '1') of a second MUX 216. An output of the second MUX 216 is coupled to an input of an update cell 220 of the scan register 208 and provides a scan out signal, labeled "SO" provided to a pin of the SIB 200. The scan out signal, SO can be coupled to the TAP or to another SIB. A control node of the second MUX 216 can be coupled to an update enable signal, labeled "UE" that is provided on a pin of the SIB 200.

The update cell 220 can provide a select signal, labeled "SEL" that can be provided to a first input (labeled '0' in FIG. 2) of the second MUX 216 and to a control node of the first MUX 204. The update cell 220 can be controlled by the clock signal, TCK.

In operation, the SIB 200 gates access to embedded instruments (e.g., a TRD coupled to an IP block) by dynamically reconfiguring a scan chain provided as the scan input signal on the scan in pin, SI, and adding (or removing) a scan segment to (or from) the scan chain. More particularly, the SIB 200 shown in FIG. 2 can add (or remove) the scan network connected between the scan in pin, TO-SI and the scan out pin, FROM-SO to the active scan path. When the SIB 200 is in the closed state, the active scan path consists of only the SIB cell between the downstream scan in pin, TO-SI and the scan out return pin, FROM-SO. As noted, a TDR (or multiple TDRs) coupled to respective IP blocks and/or another SIB (or multiple SIBs) can be coupled between the downstream scan in pin, TO-SI and the scan out return pin, FROM-SO.

In operation, de-asserting the update enable signal, UE (e.g., logical 0) causes the update cell 220 to de-assert (e.g., logical 0) the select signal, SEL, such that the SIB 200 is kept in or transitioned to a closed state. In the closed state the SIB 200 (e.g., 2 bits) is added to the scan-in signal between the scan input pin, SI and the scan output pin, SO. Thus, the SIB 200 acts as a two-bit bypass register when the SIB 200 is in the closed state.

Additionally, asserting the update enable signal, UE (e.g., logical 1) causes the update cell 220 to assert (e.g., logical 1) the select signal, SEL causing the SIB 200 to be kept in or transitioned to an opened state. In the opened state, a predetermined value is asserted at the input of the update cell 220 of the scan register 208. In response, the update cell 220 asserts the select signal, SEL (e.g., logical 1). Assertion of the select signal, SEL signal causes the first MUX 204 to select the second input connected to the scan out return pin, FROM-SO, which is fed to the shift bit register 212. Asserting the select signal, SEL also enables the shifting of scan cells in the scan path between the downstream scan in pin, TO-SI and the return scan pin, FROM-SO. Together, this adds the components (e.g., TDRs and/or SIBs) between the downstream scan-in pin, TO-SI and the return scan pin, FROM-SO to the scan chain provided to the scan input pin, SI. Accordingly, control of the update enable signal, UE causes the SIB 200 to selectively add or remove components between the downstream scan in pin, TO-SI and the return scan pin, FROM-SO to the scan signal provided at the scan input pin, SI.

Referring back to FIG. 1, as noted, the scan chain generated by the test module 154 of the IC chip test engine 150 varies considerably based on the architecture of the IC design 102 instantiated by the virtual IC chip 108 or the fabricated IC chip 104. FIGS. 3-6 illustrate examples of three different general topologies for the IC design 102 implemented by the virtual IC chip 108 or the fabricated IC chip 104. The scan chain can be configured to test a given instrument 136, such that a full test of each of the instruments 136 may entail the execution of multiple scan chains.

Figure 3:
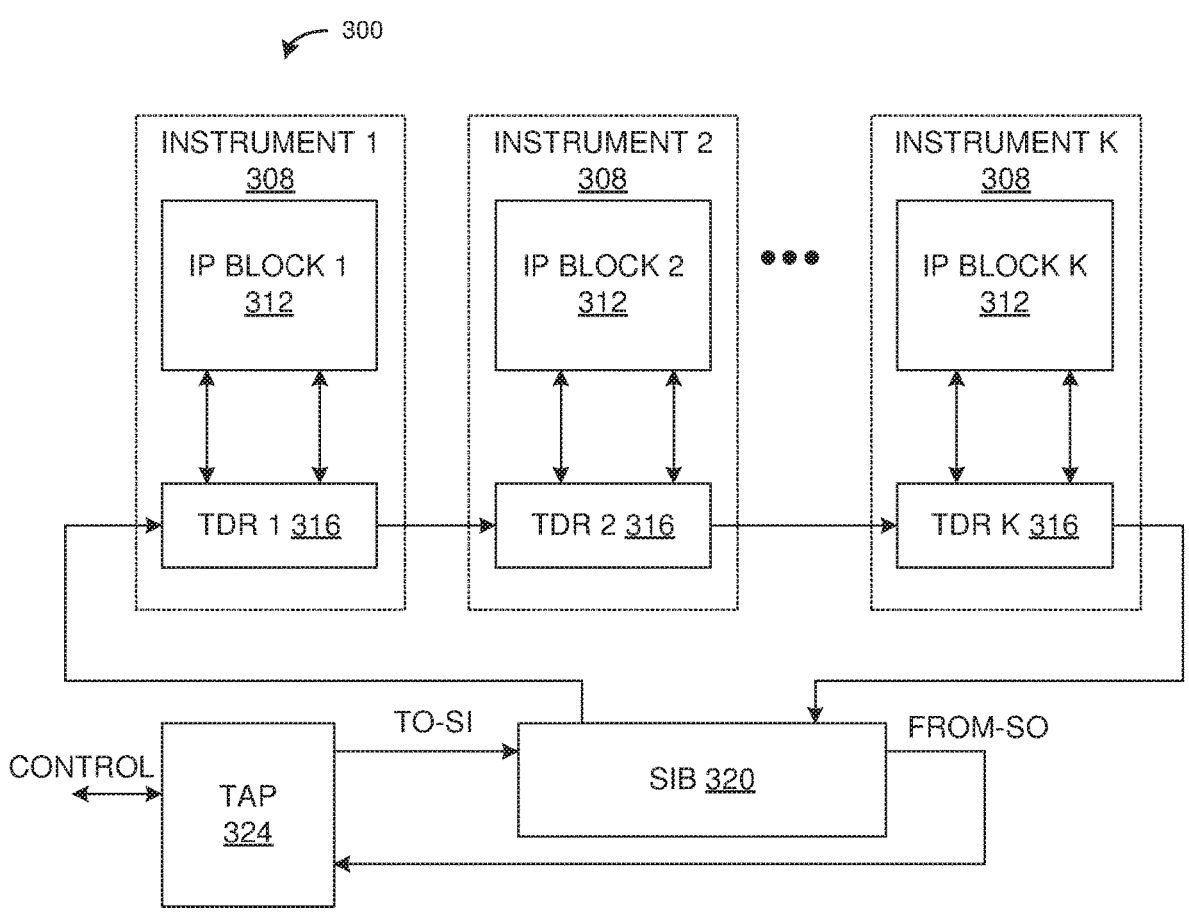
FIG. 3 illustrates a diagram of an IC design wherein a single SIB gates access to multiple instruments.

FIG. 3 illustrates an example of an IC chip 300 with a topology wherein a single SIB 320 controls access to K number of instruments 308, where K is an integer greater than or equal to two. The IC chip 300 could be employed to implement the IC design 102 of FIG. 1. Each instrument 308 can be employed to implement an instance of the instrument 136 of FIG. 1. Thus, each instrument 308 can include an IP block 312 and a TDR 316. Additionally, the IC chip 300 includes a SIB 320 coupled to a TAP 324. The SIB 320 can be employed to implement an instance of the SIB 138 of FIG. 1 and/or the SIB 200 of FIG. 2. Similarly, the TAP 324 can be employed to implement the TAP 142 of FIG. 1.

As illustrated, control signals, labeled "control" are provided to the TAP 324 from the IC chip test engine 150 of FIG. 1. The control signals include a scan chain applied on a pin labeled "TO-SI" is provided from the TAP 324 to the SIB 320 and the scan chain is returned by the SIB 320 on a pin labeled "FROM-SO" to the TAP 324.

The scan chain is formed with a series of bits that opens the SIB 320 and can load a particular TDR 316 (or multiple TDRs 316) of the K number of TDRs 316 with test data for a respective IP block 312. Each such TDR 316 can load the respective IP block 312 with the test data and each IP block 312 can reply to the TDR 316 with response data that is added to the scan chain. The scan chain can be returned to the SIB 320 (in the open condition) and the SIB can provide the return scan chain via the pin, FROM-SO to the TAP 324. Thus, as demonstrated, the scan chain generated for the IC chip 300 can open the single SIB 320 to access the particular instrument 308 of the K number of instruments 308.

Figure 4:
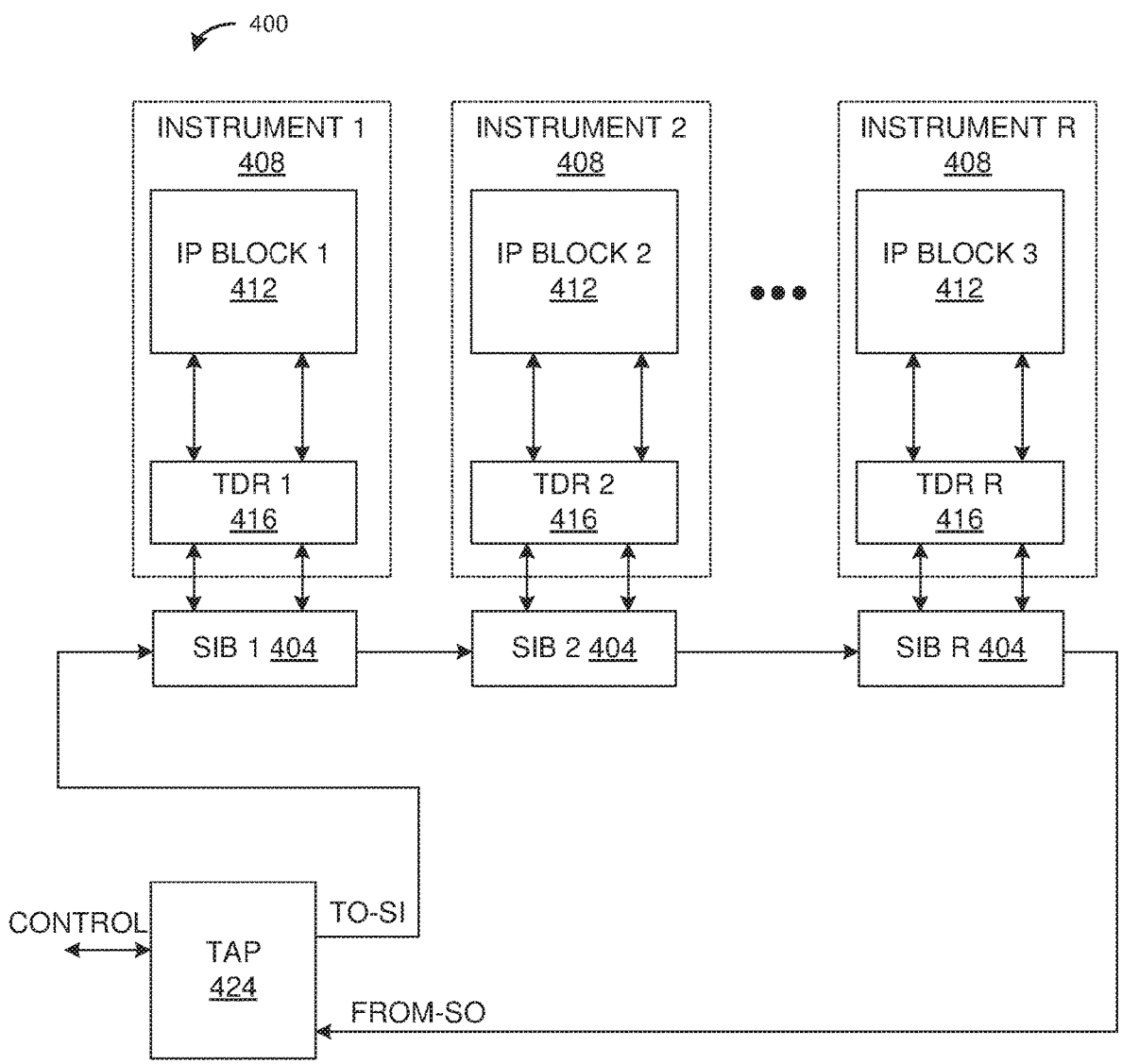
FIG. 4 illustrates a diagram of an IC design wherein each SIB gates access to a corresponding instrument.

FIG. 4 illustrates an example of an IC chip 400 with a topology wherein R number of SIBs 404 controls access to R number of instruments 408, where R is an integer greater than or equal to two. The IC chip 400 could be employed to implement the IC design 102 or the fabricated IC chip 104 of FIG. 1. Each instrument 408 can be employed to implement an instance of the instrument 136 of FIG. 1. Thus, each instrument 408 can include an IP block 412 and a TDR 416. Additionally, each SIB 404 can be employed to implement an instance of the SIB 138 of FIG. 1 and/or the SIB 200 of FIG. 2. Similarly, the TAP 424 can be employed to implement the TAP 142 of FIG. 1. In such a situation, a first SIB 404 (e.g., SIB 1) and a last SIB 404 (e.g., SIB R) can be coupled to the TAP 424.

As illustrated, control signals, labeled "control" are provided to the TAP 424 from the IC chip test engine 150 of FIG. 1. The control signals include a scan chain, provided on a pin labeled "TO-SI" is provided from the TAP 424 to each of the R number of SIBs 404 and the scan chain is returned by the last SIB 404 (SIB R) via a pin labeled "FROM-SO" to the TAP 424.

The scan chain, TO-SI can include bits that selectively open each of the R number of SIBs 404 (or some subset thereof). Each SIB 404 in the opened state loads a respective TDR 416 with test data. The test data can be applied to a respective IP block 412. In response, the IP block 412 can provide response data that is added to the scan chain. The resultant scan chain can be provided as the return scan chain via the pin FROM-SO to the TAP 424. As illustrated, each of the K number of SIBs 404 controls access to a respective instrument 408.

Figure 5:
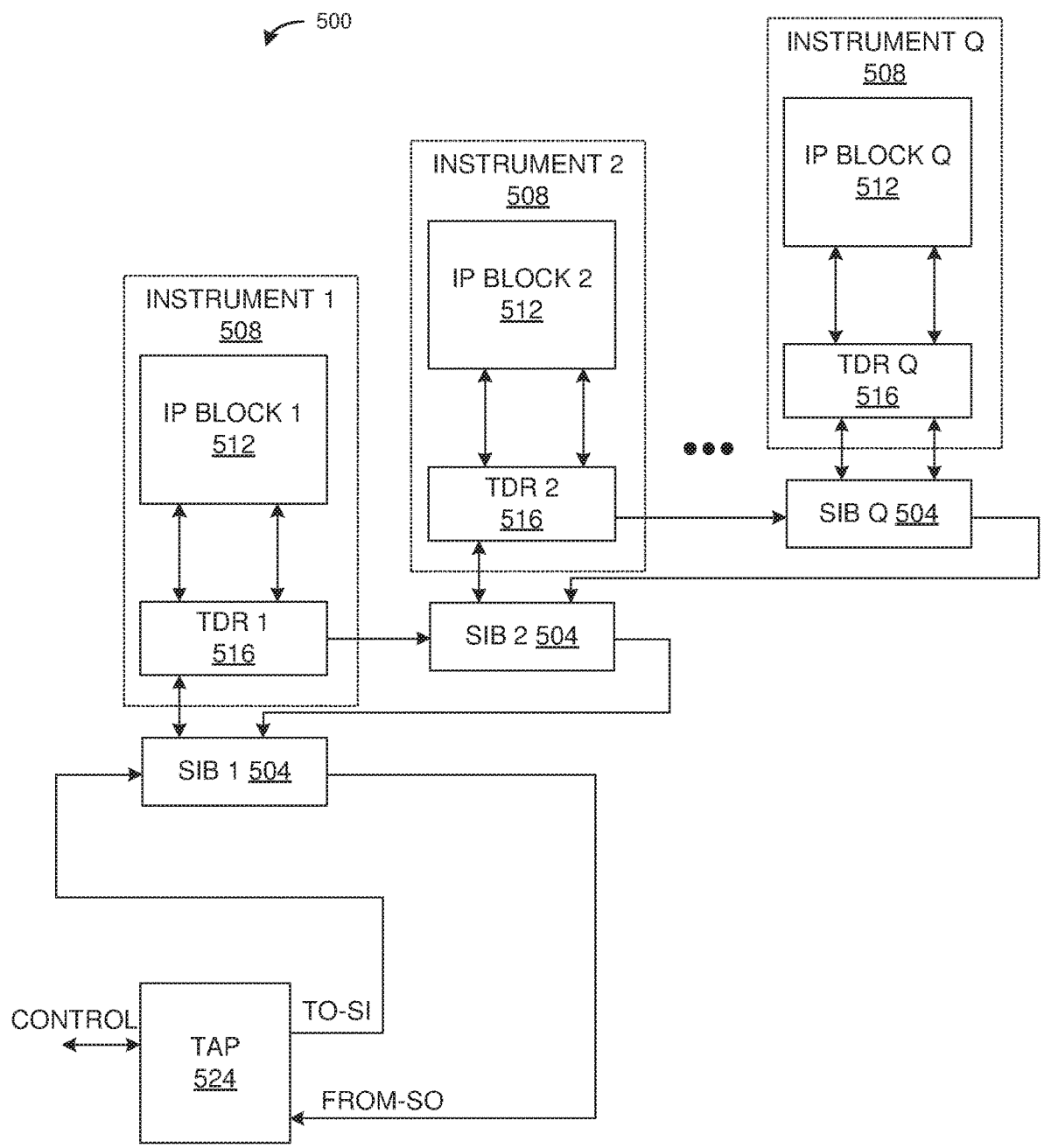
FIG. 5 illustrates a diagram of an IC design with nested SIBs gating access to instruments.

FIG. 5 illustrates an example of an IC chip 500 with a topology wherein a Q number of SIBs 504 are nested to gate access to Q number of instruments 508, where Q is an integer greater than or equal to two. The IC chip 500 could be employed to implement the IC design 102. Each instrument 508 can be employed to implement an instance of the instrument 136 of FIG. 1. Thus, each instrument 508 can include an IP block 512 and a TDR 516. Additionally, the IC chip 500 includes a SIB 504 coupled to a TAP 524. Each of the Q number of SIBs 504 can be employed to implement an instance of the SIB 138 of FIG. 1 and/or the SIB 200 of FIG. 2. Similarly, the TAP 524 can be employed to implement the TAP 142 of FIG. 1.

As illustrated, control signals, labeled "control" are provided to the TAP 524 from the IC chip test engine 150 of FIG. 1. The control signals include a scan chain provided on a pin labeled "TO-SI" that is provided from the TAP 524 to each of the Q number of SIBs 504 and the scan chain is returned by the last SIB 504 (SIB Q) on a pin labeled "FROM-SO" to the TAP 524. In the example architecture, access to a given instrument 508 entails opening downstream SIBs 504 unless the given instrument 508 is the first instrument 508 (e.g., instrument 1). The first SIB 504 gates access to the first instrument 508. Stated differently, to access the first instrument, the first SIB 504 (e.g., SIB 1) is transitioned to the opened state. Additionally, to access the Qth instrument 508, the Qth SIB 504 (SIB Q) as well as the first to penultimate SIBs 504 are also transitioned to the opened state (e.g., SIB 1 . . . SIB Q−1).

For the IC chip 500 the scan chain can include bits that selectively transition a set of the Q number of SIBs 504 to the opened state to provide access to a selected instrument 508 to load a respective TDR 516 of the selected instrument 508 with test data. The test data can be applied to a respective IP block 512. In response, the IP block 512 can provide response data that is added to the scan chain. The resultant scan chain can be provided as the return scan chain to the TAP 524. As illustrated, each of the Q number of SIBs 504 are arranged in a nested manner.

Figure 6:
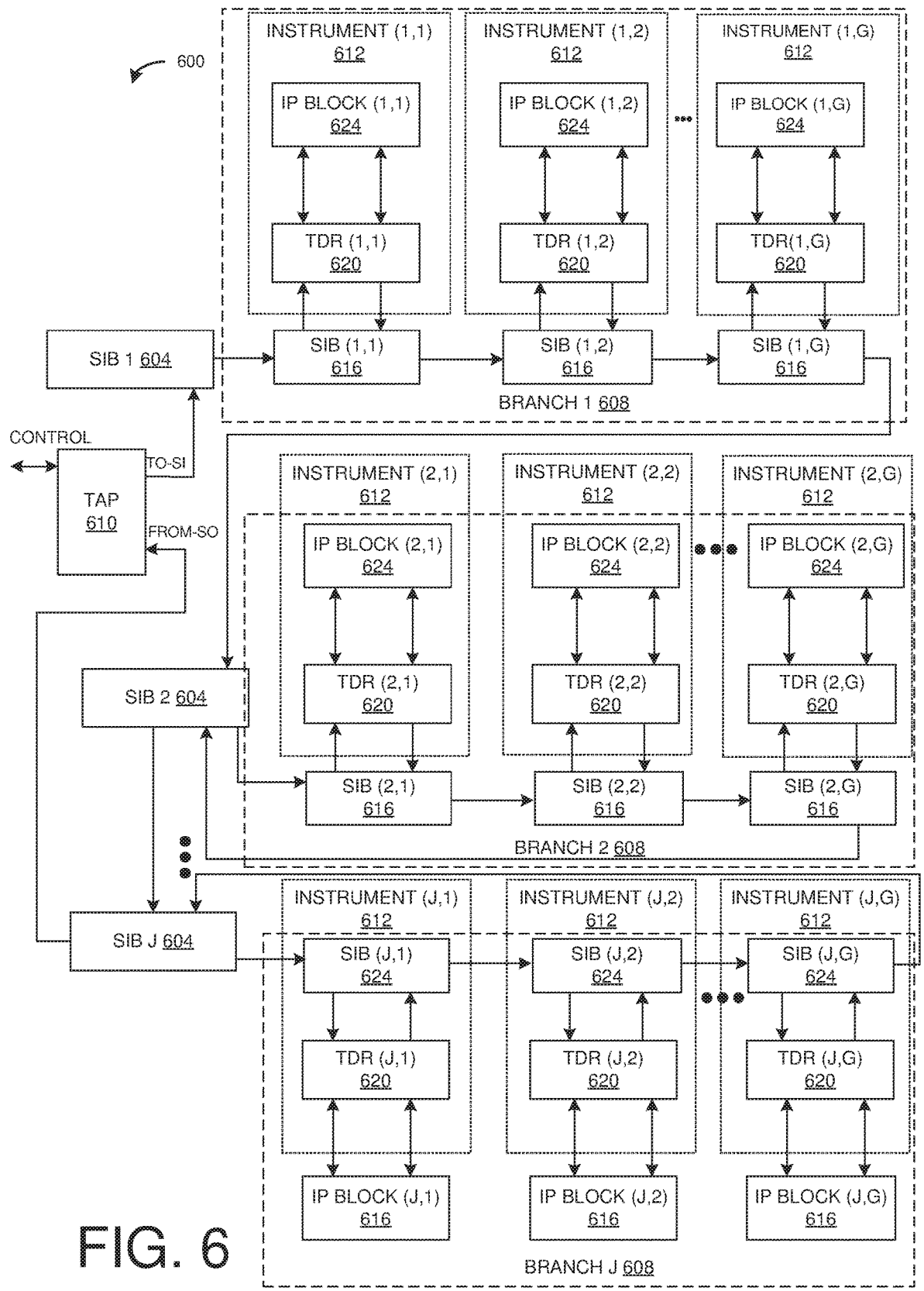
FIG. 6 illustrates a diagram of an IC design with SIBs arranged in a hierarchical manner to gate access to instruments.

FIG. 6 illustrates an example of an IC chip 600 with a topology wherein a J number of SIBs 604 gate access to J number of branches 608, where J is an integer greater than or equal to two. Each of the J number of SIBs 604 can be coupled to a TAP 610. Each branch 608 can include G number of instruments 612 and SIBs 616 that each gates access to a set of instruments 612, where G is an integer greater than or equal to one. That is, each branch 608 can be a nested SIB network. The IC chip 600 could be employed to implement the IC design 102 of FIG. 1. Additionally, it is noted that each branch 608 can have the same or different number of instruments 608 and SIBs 624.

Each instrument 612 can be employed to implement an instance of the instrument 136 of FIG. 1. Thus, each instrument 612 can include a TDR 620 and an IP block 624 that are labeled with a unique two-dimensional index number, represented with the nomenclature, i,j. The first dimension in the index number, i identifies a particular branch 608 to which the component belongs, and the second index number, j identifies a sequence with the particular branch 608. For example, a TDR 620 labeled TDR (2,2) uniquely identifies the respective TDR 620 as a second TDR 620 in the second branch 608 (branch 2). Similarly, a SIB 624 labeled SIB (J,G) is the Gth SIB 624 in the Jth branch 608. In this manner, each component of each branch 608 can be uniquely identified.

Each of the J number of SIBs 604 coupled to the TAP 610 or the SIBs 616 of the branches 608 can be employed to implement an instance of the SIB 138 of FIG. 1 and/or the SIB 200 of FIG. 2. Similarly, the TAP 624 can be employed to implement the TAP 142 of FIG. 1.

As illustrated, control signals, labeled "control" are provided to the TAP 610 from the IC chip test engine 150 of FIG. 1. The control signals include a scan chain, that is provided on a pin labeled "TO-SI" from the TAP 610 to the first SIB 604 (SIB 1) of the J number of SIBs 604 and the scan chain is returned by the last SIB 604 (SIB J) labeled "FROM-SO" to the TAP 610. In the example architecture, access to a given instrument 612 in a given branch 608 entails opening a SIB 604 gating access to the given branch 608, and opening a SIBs 616 within the given branch 608 gating access to the given instrument 612.

As an example, to access the second instrument 612 (instrument (2,2)) of the second branch 608 (branch 2), the second SIB 604 (SIB 2) is transitioned to the opened state. Additionally, the second SIB 616 (SIB (2,2)) of the second branch 608 is transitioned to the opened state, thereby leading the scan chain to the TDR 620 (TDR (2,2)) and the IP block 624 (IP block (2,2)) to access the second instrument 612 (instrument (2,2)) of the second branch 608 (branch 2). The remaining SIBs 604 and SIBs 616 can remain in the closed state. In such a situation, the scan chain can include test data for TDR (2,2) that can be applied to the IP block (2,2). The response to the test data can be added to the return scan chain provided on the pin, FROM-SO on the TAP 610. As illustrated, each of the Q number of SIBs 604 and the SIBs 616 are arranged in a hierarchical manner.

Referring back to FIG. 1, as demonstrated by IC chips 300, 400, 500 and 600 in FIGS. 3-6, the architecture of the IC design 102 instantiated by the virtual IC chip 108 or the fabricated IC chip 104 has a great deal of variety. To accommodate such variety, test patterns for individual instruments 136 are migrated to the chip level. As noted, a clear path is established between the pins of the instruments 136 and the corresponding chip level pins (e.g., pins on the fabricated IC chip 104 or the virtual IC chip 108). To establish the clear path, the scan chain includes a set of non-controlling values that are applied at intermediate logic (logic gates).

To migrate the test patterns from instrument level to any level up in the hierarchy, the IC chip test engine 150 processes the architecture data 164 to identify pin correspondence and preconditioning. The test module 154 generates the test patterns based on the identified correspondence and preconditioning to operate the network elements identified to provide an isolated path and to control and observe the test data from the boundary of the instruments 136 (e.g., the IP boundary) to a higher level chip boundary, such as a system on a chip (SoC) boundary. Accordingly, the scan chain instance generated for the IC design compensates for the logical position of processes the SIBs 138 and generate patterns to open/close the SIBs 138 to gain access to the given TDRs 134 logically positioned downstream (e.g., behind) SIBs 138.

The IC chip test engine 150 can analyze the architecture data 164 to identify a set of SIBs (one or more SIBs) that gate access to a particular instrument 136. Additionally, to generate the scan chain for the IC design 102, the test module 154 for the test module 154 selects a test algorithm based on the processed architecture data 164 characterizing a layout of the IC design instantiated as the virtual IC chip 108 or the fabricated IC chip 104 and based on the instrument access script 156. The first test algorithm can be selected in situations where a particular SIB 138 needs to be transitioned to the opened state and then to the closed state while operations on a selected instrument 136 are completed. That is, in the first test algorithm, the SIBs 138 can be transitioned to the closed state while operating the TDR 134 of a selected instrument 136. More particularly, Table 1 describes the first test algorithm employable by the test module 154 for generating the scan chain that transitions a given SIB 138 to the opened state.

TABLE 1

| Operation | Operation Description |
|---|---|
| 1 | Select Scan chain based on a shortest scan length to operate a SIB |
| 2 | Generate load data to open the SIB by asserting a value of '1' for the scan bit register for the SIB |

In operation 1 (selecting the scan chain based on the shortest scan length, the test module 154) if the given SIB 138 can be part of multiple scan chains and can be operated via multiple scan chains, the scan chain that provides the shortest length to access the SIB bit (e.g., the bit for operating the scan register 208 of FIG. 2) is selected for the scan chain. Additionally, in operation 2 of the first test algorithm (e.g., generating the load data), the bit to open the given SIB 138 is added to the load data rather than opening the given SIB 138 in a separate operation.

Additionally, the scan chain generated by the test module 154 using the first test algorithm operates the given TDR 134 of the given instrument 136 and closes the given SIB 138. More particularly, Table 2 describes the first test algorithm employable by the test module 154 for generating the scan chain that operates the given TDR 134 and closes the given SIB 138. The operations in Table 2 are labeled as continuing the number sequence of Table 1.

TABLE 2

| Operation | Operation Description |
|---|---|
| 3 | Generate the load vector to load the TDR of the instrument with test data |
| 4 | In the same vector, set the SIB scan bit back to '0' to close the SIB |

In Table 2, operation 3 (e.g., generating the load vector) includes employing IP block test data 168 for the given TDR 134 and embedding the IP block test data 168 in the scan chain in a format consumable by the given TDR 134 (e.g., PDL instructions). Additionally, the operation 4 in Table 2 (e.g., setting the SIB scan bit to 0) causes the given SIB 138 to automatically transition to the closed state once the operation to access the given TDR 134 is completed.

As an example of execution of the first test algorithm, consider the IC chip 300 of FIG. 3, wherein a test pattern is to be executed on the second IP block 312 (IP block 2), such that the second instrument 308 (instrument 2) is the selected instrument 308. In such a situation, the scan chain generated using the first test algorithm can include bits to open the SIB 320 and a load vector for the second TDR 316 (TDR 2) embedded in the scan chain is provided from the TAP 324 and a bit embedded in the scan chain closes the SIB 320 after the first TDR 316 executes a test on the first IP block 312. The load vector can also include bits (e.g., PDL commands) that cause the first TDR 316 to pass the embedded test pattern to the second TDR 316.

Using the approach in the first test algorithm, the SIB 138 gating access to a selected instrument 136 is transitioned to the closed state automatically as soon as the load vector is completely loaded in the scan chain to operate the TDR 134 of the selected instrument 308 and the SIB scan bit (e.g., UpdateEnable in FIG. 2) is asserted after completion of a shift phase. Loading the de-assert value in the SIB bit while loading the data to operate the TDR 134 of the selected instrument 136 saves one full load vector which would have been needed to transition the SIB 138 gating access to the selected instrument 136 to the closed state immediately after operations of the TDR 134 of the selected instrument 136 have been executed. Thus, one complete scan shifting cycle (e.g. a cycle for closing the given SIB 138) is obviated for the full length of the scan chain. This provides for considerable saving in total number of test patterns that are generated from the IC chip test engine 150. For instance, in the IC chip 400 of FIG. 4, R number of test patters for testing the R number of IP blocks 412 (e.g., executing R number of scan chains), then R number of scan cycles can be saved because the R number of SIBs 404 could be closed individually at the end of each scan chain. Additionally, the first test algorithm is employable in situations where the instrument access script 156 does not have the same instrument 136 being accessed multiple times consecutively and the selected instrument 136 has one SIB 138 gating access to the selected instrument (e.g., the furthest downstream SIB 138 gating access to the selected instrument 136 is not nested). That is, the order of access to the instruments 136 in the instrument access script 156 indicates that the selected instrument 136 is accessed once or multiple times in a non-consecutive order and the selected instrument 136 does not have multiple SIBs 134 gating access.

As an alternative, a second test algorithm can be selected by the test module 154 in situations where the instrument access script 156 indicates that access to multiple consecutive test patterns are needed to test a selected IP block 130, and a selected instrument that includes the selected IP block 130 has one SIB 138 gating access to the selected instrument 136 (e.g., the furthest downstream SIB 134 gating access to the selected instrument 136 is not nested). The second test algorithm can avoid the need to open and close SIBs 138 multiple times to execute the multiple test patterns. In such a situation, the IC chip test engine 150 can maintain a cache database 180 that is stored in the memory 116 to hold data for storing the multiple test patterns for the IP block 130 of the selected instruments 136. In particular, the test module 154 can access the IP block test data 168 to identify each test pattern assigned to the selected IP block 130 and load the test patterns in the cache database 180.

The cache database 180 stores operation data that is available at a time when controller bits for a particular SIB 138 do not need to change value. Additionally, the cache database 180 is configured such that operations are retrievable from the cache database 180 at a time that controlling SIB bits need to be changed or at an exit. In the second test algorithm, the test module 154 can employ the operations described in Table 1 with respect to the first test algorithm for generating the scan chain to open a given SIB 138.

Additionally, the scan chain generated by the test module 154 using the second test algorithm operates the TDR 134 of the selected instrument 136 and transitions to the SIB 138 gating access to the selected instrument 136 to the closed state. More particularly, Table 3 describes the first test algorithm employable by the test module 154 for generating the scan chain that operates the TDR 134 of the selected instrument 136 and closes the SIB 138 gating access to the selected instrument. The operations in Table 3 are labeled as continuing the number sequence of Table 1.

TABLE 3

| Operation | Operation Description |
| --- | --- |
| 3 | Load an assert value (e.g., logical 1) in the scan bit of the SIB gating access to the selected instrument |
| 4 | Generate a load vector to load the TDR of the selected instrument with desired load data for an entry in the cache database |
| 5 | Repeat generation of the load vector for each entry in the cache database associated with the selected instrument |
| 6 | Load a de-assert value (e.g., logical 0) in the scan bit of the SIB gating access to the selected instrument in a last load vector |
| 7 | Set the SIB bit to the de-assert value to automatically close the SIB gating access to the selected instrument after access to the TDR is completed |

In

| Operation | Operation Description |
| --- | --- |
| 3 | Load an assert value (e.g., logical 1) in the scan bit of the SIB gating access to the selected instrument |
| 4 | Generate a load vector to load the TDR of the selected instrument with desired load data for an entry in the cache database |
| 5 | Repeat generation of the load vector for each entry in the cache database associated with the selected instrument |
| 6 | Load a de-assert value (e.g., logical 0) in the scan bit of the SIB gating access to the selected instrument in a last load vector |
| 7 | Set the SIB bit to the de-assert value to automatically close the SIB gating access to the selected instrument after access to the TDR is completed |

Table 3, operation 3 (e.g., load an assert value) in the scan bit (e.g., the update enable signal of FIG. 2) ensures that the SIB 138 gating access to the selected instrument 136 is in the opened state. Additionally, operation 4 in

| Operation | Operation Description |
| --- | --- |
| 3 | Load an assert value (e.g., logical 1) in the scan bit of the SIB gating access to the selected instrument |
| 4 | Generate a load vector to load the TDR of the selected instrument x gating desired load data for an entry in the cache database |
| 5 | Repeat generation of the load vector for each entry in the cache database associated with the selected instrument |
| 6 | Load a de-assert value (e.g., logical 0) in the scan bit of the SIB gating access to the selected instrument in a last load vector |
| 7 | Set the SIB bit to the de-assert value to automatically close the SIB gating access to the selected instrument after access to the TDR is completed |

Table 3 (e.g., generating a load vector) causes the test module 154 to provide an embedded test pattern for an IP block of the selected instrument 136 from the cache database 180 into a format employable by a respective TDR 134 (e.g., PDL instructions) of the selected instrument 136 to execute a test on the IP block 130 of the selected instrument 136. Operation 5 in

| Operation | Operation Description |
| --- | --- |
| 3 | Load an assert value (e.g., logical 1) in the scan bit of the SIB gating access to the selected instrument |
| 4 | Generate a load vector to load the TDR of the selected instrument with desired load data for an entry in the cache database |
| 5 | Repeat generation of the load vector for each entry in the cache database associated with the selected instrument |
| 6 | Load a de-assert value (e.g., logical 0) in the scan bit of the SIB gating access to the selected instrument in a last load vector |
| 7 | Set the SIB bit to the de-assert value to automatically close the SIB gating access to the selected instrument after access to the TDR is completed |

Table 3 (e.g., repeat the generation of the load vector) causes the test module 154 to repeat the generation of the load vector for each test pattern in the cache database 180 that is assigned to the selected instrument 136.

Operation 6 in

| Operation | Operation Description |
| --- | --- |
| 3 | Load an assert value (e.g., logical 1) in the scan bit of the SIB gating access to the selected instrument |
| 4 | Generate a load vector to load the TDR of the selected instrument with desired load data for an entry in the cache database |
| 5 | Repeat generation of the load vector for each entry in the cache database associated with the selected instrument |
| 6 | Load a de-assert value (e.g., logical 0) in the scan bit of the SIB gating access to the selected instrument in a last load vector |
| 7 | Set the SIB bit to the de-assert value to automatically close the SIB gating access to the selected instrument after access to the TDR is completed |

Table 3 (e.g., loading the de-assert value in a last load vector) causes the test module 154 to add a sequence of bits to the scan chain that will cause the SIB 138 gating access to the selected instrument 136 to transition to the closed state. Operation 7 in

| Operation | Operation Description |
| --- | --- |
| 3 | Load an assert value (e.g., logical 1) in the scan bit of the SIB gating access to the selected instrument |
| 4 | Generate a load vector to load the TDR of the selected instrument with desired load data for an entry in the cache database |
| 5 | Repeat generation of the load vector for each entry in the cache database associated with the selected instrument |
| 6 | Load a de-assert value (e.g., logical 0) in the scan bit of the SIB gating access to the selected instrument in a last load vector |
| 7 | Set the SIB bit to the de-assert value to automatically close the SIB gating access to the selected instrument after access to the TDR is completed |

Table 3 (e.g., set the SIB scan bit to the de-assert value) causes the SIBs 138 gating access to the selected instrument 136 to transition to the closed state upon the TDR 134 of the selected instrument 136 completing the tests on the selected IP block 130.

As an example of execution of the second test algorithm, consider the IC chip 400 of FIG. 4, wherein the selected instrument is the second instrument 408 (instrument 2). In such a situation, the scan chain can include load vectors that cause the second SIB (SIB 2) to transition to the opened state and stay in the opened state for multiple applications of test patterns embedded in the scan chain. In this example, a last load vector in the scan chain can include bits that cause the second SIB 404 to transition to the closed state automatically.

Referring back to FIG. 1, by employing the second test algorithm, the SIB gating access to the selected instrument 136 is transitioned to and kept in the opened state until the TDR 134 of the selected instrument 136 has completed operations on the corresponding IP block 130. Similar to the first test algorithm, this approach avoids the need for a separate load vector to close the SIB 138 gating access to the selected instrument 136, thereby obviating one scan shifting cycle for the full length of the scan chain.

Additionally, the second test algorithm can cause the TDR 134 of the selected instrument 136 to execute multiple test patterns on the corresponding IP block while the SIB 138 gating access to the selected instrument 136 is transitioned to the opened state and then to the closed state one time. This will provide considerable reduction of the total test time for the IC design 102 instantiated by the virtual IC chip 108 or the fabricated IC chip 104. For instance, depending upon the frequency of access of the to the TDR 134 of the selected instrument 136 in the instrument access script 156, the second test algorithm approach provides for up to 50% saving in the test patterns count to operate the TDRs 134. Moreover, the second test algorithm is employable in situations where the instrument access script 156 indicates that the same instrument 136 is accessed multiple times consecutively and the selected instrument 136 has one upstream SIB 138 (e.g., the furthest downstream SIB gating access to the selected instrument 136 is not nested).

As another alternative, a third test algorithm can be selected by the test module 154 in situations where the instrument access script 156 indicates that one or more test patterns are needed to test a selected IP block 130, and the architecture data 164 indicates a selected instrument 136 that includes the selected IP block 130 has multiple gating SIBs 138, which indicates that the selected instrument 136 is accessible via a nested SIB 138 upstream from the selected instrument 136. Opening nested SIBs is a sequential process. A SIB 138 that is nested deep in a network cannot be operated until upstream SIBs 138 gating access to the furthest downstream SIB 138 are in the opened state. The third testing algorithm can include a merging of load test vectors to operate the furthest downstream SIB 138 gating access to the selected instrument 136.

In the third test algorithm, the test module 154 transitions the furthest downstream SIB 138 gating access to the selected instrument 136 after transitioning or keeping SIBs 138 upstream from the nested SIB 138 that need to be in the opened state. Table 4 describes the first test algorithm employable by the test module 154 for generating the scan chain that transitions a given SIB 138 to the opened state.

TABLE 4

| Operation | Operation Description |
| --- | --- |
| 1 | Identify SIBs gating access to the selected instrument |
| 2 | Recursively identify SIBs that are gating access to the furthest downstream SIB gating access to the selected instrument that are needed for current preconditioning |
| 2a | Identify SIBs that are gating the access and provide scan chains to operate the SIBs gating access to the selected instrument |

TABLE 4-continued

| Operation | Operation Description |
| --- | --- |
| 2b | Select the scan chain with the shortest scan length to operate a SIB gating access to the selected instrument |
| 2c | Generate a load vector to transition the SIB gating access to the selected instrument to the opened state |
| 2d | Markoff the SIBs gating access to the selected instrument that are set to the desired value |
| 2e | Repeat markoff operation (2d) untill all SIBs gating access to the selected instrument are marked off |
| 3 | Merge the load vectors generated in operation 2 |
| 4 | Execute the merge load vectors to operate the SIBs gating access to the selected instrument |
| 5 | Generate a load vector to operate a TDR of the selected instrument that includes desired load data |

In operation 1 of Table 4, (e.g., selecting the scan chain based on the shortest scan length), the test module 154 is programmed to identify SIBs 138 that are gating access to the selected instrument 136 that need to be operated to access the selected instrument 136. In operation 2 of Table 4 (e.g., recursively identify SIBs that are gating access to the furthest downstream SIB 138 gating access to the selected instrument 136), the test module 154 identifies the SIB 138 that is upstream from the selected instrument 136 that provides the test pattern to the TDR 134 of the selected instrument 136. Moreover, the Operation 2 of Table 4 has sub-operations. In particular, in operation 2a, the SIBs 138 that are gating access to the selected instrument 136 are identified. In operation 2b, the scan chain with a shortest length to operate a particular SIB 138 gating access to the selected instrument 136 is selected. In operation 2c, a load vector to transition the particular SIB 138 to the opened state is generated. In operation 2d, the particular SIB 138 is marked off for having been set to a desired value. In operation 2e, operations 2a-2e are repeated until each of the SIBs 138 gating access to the selected instrument 136 are marked off.

In operation 3 of Table 4, the test module 154 merges load vectors generated in operation 2, that were generated for each SIB 138 gating access to the selected instrument 136. Operation 3 also includes sub-operations. In particular, operation 3 avoids clashing care bits (e.g., control bits or data bits) in the load vectors and merges the load vectors in situations where a scan length and a scan chain are the same.

In operation 4 of Table 4, a set of the merged load vectors generated in operation 3 are executed to transition each of the SIBs 138 gating access to the selected instrument 136 to the opened state. In operation 5 of Table 4, a load vector is generated to operate the TDR 134 of the selected instrument 136. In some examples, this can entail a single load vector that is based on a single test patter. In other examples, this can entail multiple load vectors based on multiple test patterns extracted from the cache database 180, as described with the second test algorithm. Additionally, in the third test algorithm operation of the first test algorithm (e.g., generating the load data), the bit to open the given SIB 138 is added to the load data rather than opening the given SIB 138 in a separate operation.

In the third test algorithm, the test module 154 closes the furthest downstream SIB 138 gating access to the selected instrument 136 after the test patterns have been executed on the selected IP block 130. More particularly, Table 5 describes operations that continue from the operation of Table 4 to control the SIBs gating access to the selected instrument 136.

TABLE 5

| Operation | Operation Description |
|---|---|
| 6 | Close the furthest downstream SIB gating access to the selected instrument at the time of loading the data for the last access to the selected instrument |
| 7 | Keep SIBs gating access to the furthest downstream SIB gating access to the selected instrument in the opened state |
| 8 | Identify next instrument in the scan chain, and identify SIBs that need to be opened and SIBs that need to be closed |
| 9 | Generate single load vector to for SIBs gating access to the next instrument (operation 3) |

In Table 5, operation 6 causes the test module 154 to add commands to the scan chain to transition the furthest downstream SIB 138 gating access to the selected instrument 136 to the closed state after loading data in the TDR 134 of the selected instrument 136. Moreover, at operation 7, other SIBs 138 gating access to the SIB 138 upstream from the selected instrument 136 are kept in an opened state. In operation 8, the test module 154 identifies a next instrument 136 that is to be accessed in the scan chain, and identifies the SIBs 138 that gate access to the next instrument 136. In operation 9, the test module 154 generates a single load vector (based on a plurality of merge load vectors, as described in operation 3 of Table 4), such that the SIBs gating access to the next instrument 136 are transitioned to the opened state. In this manner, one or more test patterns can be loaded in the TDR 134 of the next instrument 136 in the manner described herein.

As an example of execution of the third test algorithm, consider the IC chip 500 of FIG. 5, wherein the selected instrument is the Qth instrument 508 (instrument Q). In such a situation, the Qth SIB 504 (SIB Q) would be the SIB 504 upstream from the Qth instrument 508. Additionally, SIBS 1 to Q would be gating access to the Qth instrument, and SIBS 1 to Q–1 504 would be gating access to the Qth SIB 504. The scan chain can include bits that cause SIBs 1-Q 504 to transition to the opened state and stay in the opened state for one or more applications of test patterns embedded in the scan chain. In this example, a last load vector of the scan chain can include bits that cause the Qth SIB 504 to transition to the closed state automatically.

Continuing with this example, it is presumed that the first instrument 508 (instrument 1) is the next instrument accessed in the scan chain. Thus, using the third test algorithm, the scan chain would include bits to cause SIBS 2 to Q–1 to transition to the closed state, keeping the first SIB 504 (SIB 1) in the opened state. In this manner test data can be loaded in the first TDR 516 (TDR 1) of the first instrument 508 (the next instrument in the scan chain).

As another example of execution of the third test algorithm, consider the IC chip 600 of FIG. 6, wherein the selected instrument is the Gth instrument 612 in the second branch 608 (instrument (2,G)). In such a situation, the SIB 616 labeled SIB (2,G) is upstream from the instrument (2,G). Additionally, the SIBs 604 labeled SIB 2 and SIB (2,G) would be gating access to instrument (2,G), and SIB 2 would be gating access to SIB (2,G). The scan chain can include bits that cause SIB 2 and SIB (2,G) to transition to the opened state and stay in the opened state for one or more applications of test patterns embedded in the scan chain. In this example, the last load vector of the scan chain can include bits that cause the SIB (2,G) to transition to the closed state automatically.

Continuing with this example, it is presumed that the second instrument 508 in the second branch (instrument (2,2)) is the next instrument accessed in the scan chain. Thus, using the third test algorithm, the scan chain would include bits to cause the SIB 616 labeled SIB (2,2) to transition to the closed state, keeping the SIB 2 in the opened state. In this manner test data can be loaded in the second TDR 516 of the second branch 608 (TDR (2,2)) of the instrument (2,2) (the next instrument in the scan chain).

Referring back to FIG. 1, by selecting the appropriate test algorithm (namely the first, second or third test algorithm), the IC chip test engine 150 can complete a test of the IC design instantiated by the virtual IC chip 108 or the fabricated IC chip 104. In particular, depending on the architecture of the IC chip, superfluous transitions of SIBs 138 can be curtailed. Stated differently, the selected test algorithm can add bits to scan chains that cause the SIBs 138 to transition to the opened state or the closed state as part of load vectors in the scan chains. Moreover, as discussed, the number of such transitions can be curtailed to reduce a time needed to complete a test of the IC design 102 instantiated by the virtual IC chip 108 or the fabricated IC chip 104.

In view of the foregoing structural and functional features described above, example methods will be better appreciated with reference to FIGS. 7-10. While, for purposes of simplicity of explanation, the example methods of FIG. 7-10 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Figure 7:
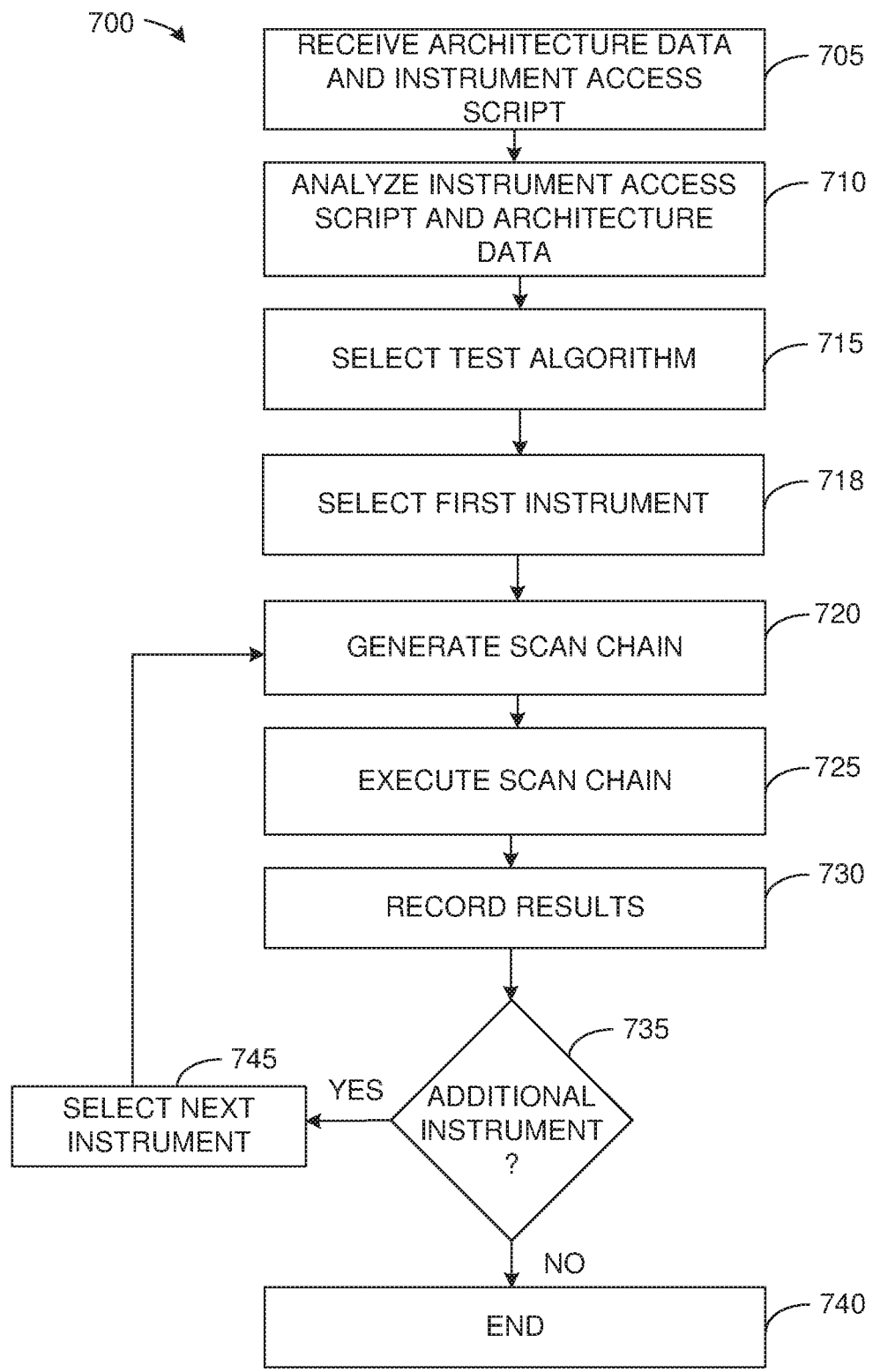
FIG. 7 illustrates a flowchart of an example method for testing an IC design.

FIG. 7 illustrates a flowchart of an example method 700 for executing a test of an IC design implemented as a virtual IC chip or a fabricated IC chip. The method 700 can be implemented by a computing platform executing an IC chip test engine, such as the IC chip test engine 150 executing on the computing platform 112 of the system 100 of FIG. 1. The IC design can be implemented as the IC design 102 instantiated as the virtual IC chip 108 or the fabricated IC chip 104 of FIG. 1. At 705, the computing platform can receive IC chip test data (e.g., the IC chip test data 158 of FIG. 1) and an instrument access script (e.g., the instrument access script of FIG. 1) that defines an order of tests in the IP blocks (e.g., IP blocks 130 of FIG. 1) of instrument in the IC design (e.g., the instruments 136 of FIG. 1). The instrument access script can indicate that the same instrument 136 is to be tested once, multiple times consecutively or multiple times nonconsecutively.

At 710, the IC chip test engine can analyze the instrument access script and architecture data of the IC chip test data to determine a correspondence and preconditioning of pins been the chip level and the IP block level for each IP block included in the instrument access script. The analysis can reveal a set of SIBs (e.g., one or more) that gate access to each instrument in the IC design (or some subset thereof). At 715, the IC chip test engine selects a test algorithm, from a first test algorithm, a second test algorithm and a third test algorithm based on the analysis executed at 710. The first test algorithm can be selected in situations where a set of SIBs in the IC design needs to be transitioned to the opened state and then to the closed state while operations of a particular instrument in the instrument access script (referred to as a selected instrument) are completed and the instrument access script indicates that multiple test patterns are not provided to the same instrument consecutively. The second test algorithm can be selected by the IC chip test engine in situations where the instrument access script indicates that access to multiple consecutive test patterns are needed to test a particular IP block of a particular instrument, and the particular instrument has one SIB gating access thereto. The third test algorithm can be selected in situations where the instrument access script indicates that one or more test patterns are needed to test a particular IP block of a particular instrument, and the architecture data indicates the particular instrument has multiple SIBs gating access thereto, which in turn indicates that the particular instrument is accessible via a furthest downstream SIB (e.g., a deepest nested SIB) of the multiple SIBs gating access to the selected instrument.

At 718, the IC chip test engine selects a first instrument for testing that is identified in the instrument access script, which is referred to as a selected instrument. At 720, the IC chip test engine can generate a scan chain for the selected instrument that employs the selected test algorithm. At 725, the IC chip test engine can execute the scan chain by sending the scan chain to an interface for the virtual IC chip or the fabricated IC chip. At 730, the IC chip test engine can record results (e.g., a response to the scan chain) for the selected instrument. At 735, a determination can be made by the IC chip test engine as to whether the instrument access script indicates that an additional instrument is to be tested. If the determination at 735 is positive (e.g., YES), the method 700 proceeds to 740, where the method 700 ends. If the determination at 740 is negative (e.g., NO), the method 700 proceeds to 745. At 745, the IC chip test engine selects a next instrument identified in the test access script, which next instrument is the selected instrument, and the method 700 returns to 720.

Figure 8:
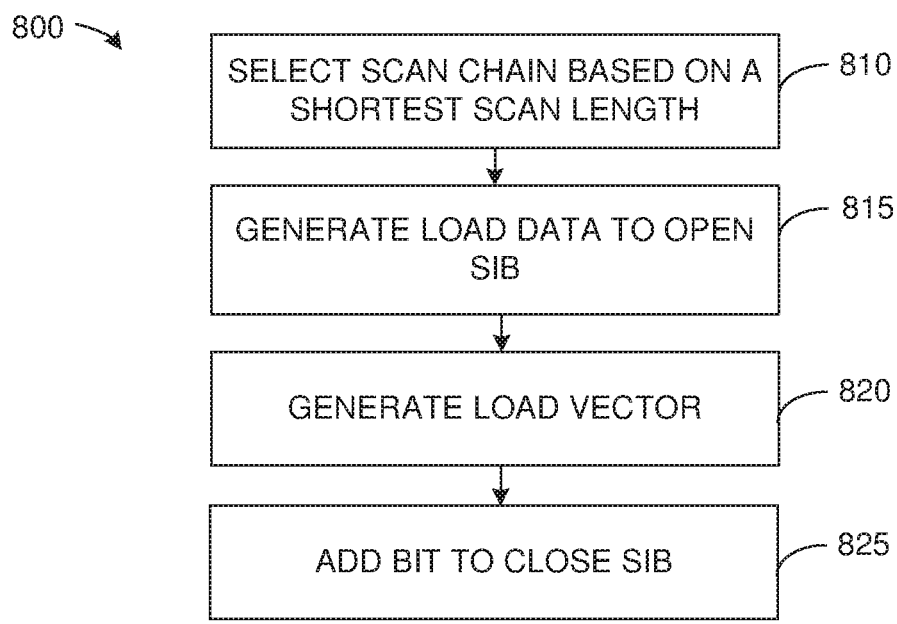
FIG. 8 illustrates a flowchart of an example method for implementing a first testing algorithm on an IC design.

FIG. 8 illustrates a flowchart of an example method 800 for executing the first test algorithm described with respect to the method 700 of FIG. 7 for a selected instrument. The method 800 can be executed by an IC chip test engine, such as the IC chip test engine 150 of FIG. 1. The first test algorithm can be selected in situations where one SIB of an IC design (e.g., the IC design 102 of FIG. 1) needs to be transitioned to the opened state and then to the closed state while operations on a selected instrument are completed. That is, in the first test algorithm, the SIB can be transitioned to the closed state with the load vectors operating the TDR of the selected instrument. More particularly, at 810, the IC chip test engine can select a shortest scan length to operate a SIB gating access to the selected instrument. At 815, load data is generated by the IC chip test engine to transition the SIB gating access to the selected instrument to the opened state. Stated differently, at 815, the bit to open the SIB gating access to the selected instrument is added to the load data instead of requiring a separate operation.

At 820, a load vector that loads a TDR of the selected instrument with test data is generated by the IC chip test engine. At 825, a bit is added to the load vector by the IC chip test engine to cause the SIB gating access to the selected instrument to automatically close once the operation to access the TDR of the selected instrument has completed. In this manner, a separate operation to close the SIB gating access to the selected instrument is obviated.

Figure 9:
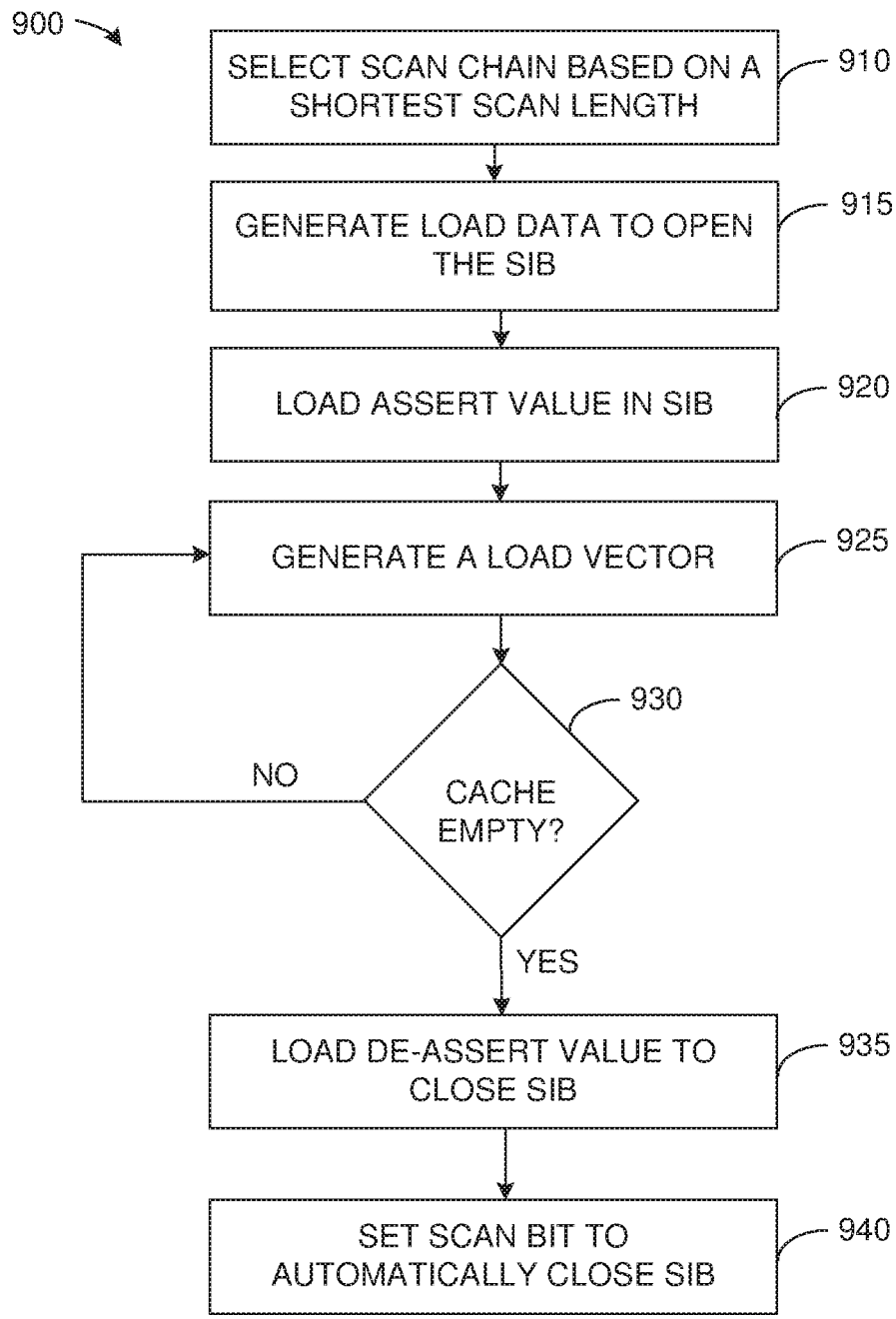
FIG. 9 illustrates a flowchart of an example method for implementing a second testing algorithm on an IC design.

FIG. 9 illustrates a flowchart of an example method 900 for executing the second test algorithm described with respect to the method 700 of FIG. 7 for a selected instrument. The method 900 can be executed by an IC chip test engine, such as the IC chip test engine 150 of FIG. 1. As noted, the second test algorithm can be selected in situations where an instrument access script indicates that access to multiple consecutive test patterns are needed to test a selected IP block of the selected instrument of an IC design (e.g., the IC design 102 of FIG. 1) and the selected instrument has one SIB gating access thereto (e.g., the furthest downstream SIB gating access to the selected instrument is not nested). The second test algorithm can avoid the need to open and close the SIB gating access to the selected instrument multiple times to execute the multiple test patterns.

To execute the method 900, the IC chip test engine can maintain a cache database (e.g., the cache database 180 of FIG. 1) to hold data for storing the multiple test patterns for the IP block of the selected instruments. The cache database stores operation data that is available at a time when controller bits for a particular SIB do not need to change value. Additionally, the cache database is configured such that operations are retrievable from the cache database at a time that controlling SIB bits need to be changed or at an exit.

At 910, the IC chip test engine can select a shortest scan length to operate a SIB gating access to the selected instrument. At 915, load data is generated by the IC chip test engine to transition the SIB gating access to the selected instrument to the opened state, such that the bit to open the SIB gating access to the selected instrument is added to the load data.

At 920, the IC chip test engine loads an assert value (e.g., a logical 1) in a scan bit of the SIB gating access to the selected instrument. The assert value in the scan bit ensures that the SIB gating access to the selected instrument remains open while the cache database for the selected instrument still has entries. At 925, the IC chip test engine retrieves an entry from the cache database to generate a load vector for the selected instrument. At 930, the IC chip test engine makes a determination as to whether the cache database for the selected instrument is empty. If the determination at 930 is negative (e.g., NO), the method 900 returns to 925. If the determination at 930 is positive (e.g., YES), the method 900 proceeds to 935. At 935, the IC chip test engine loads a scan bit of the SIB gating access to the selected instrument to a de-assert value (e.g., logical 0). The operations at 935 cause an IC chip implementing the IC design to add a sequence of bits to the scan chain that will close the SIB gating access to the selected instrument. At 940, the scan bit is set to the de-assert value (e.g., logical 0) to automatically close the SIB gating access to the selected instrument after operations on the selected instrument have completed.

By employing the second test algorithm, the SIB gating access to the selected instrument is transitioned to and kept in the opened state until a TDR of the selected instrument has completed operations on a corresponding IP block. Similar to the first test algorithm, this approach avoids the need for a separate load vector to close the SIB gating access to the selected instrument, thereby obviating one scan shifting cycle for the full length of the scan chain. Additionally, the second test algorithm can cause the TDR of the selected instrument to execute multiple test patterns on the corresponding IP block while the SIB gating access to the selected instrument is transitioned to the opened state and then to the closed state one time.

Figure 10:
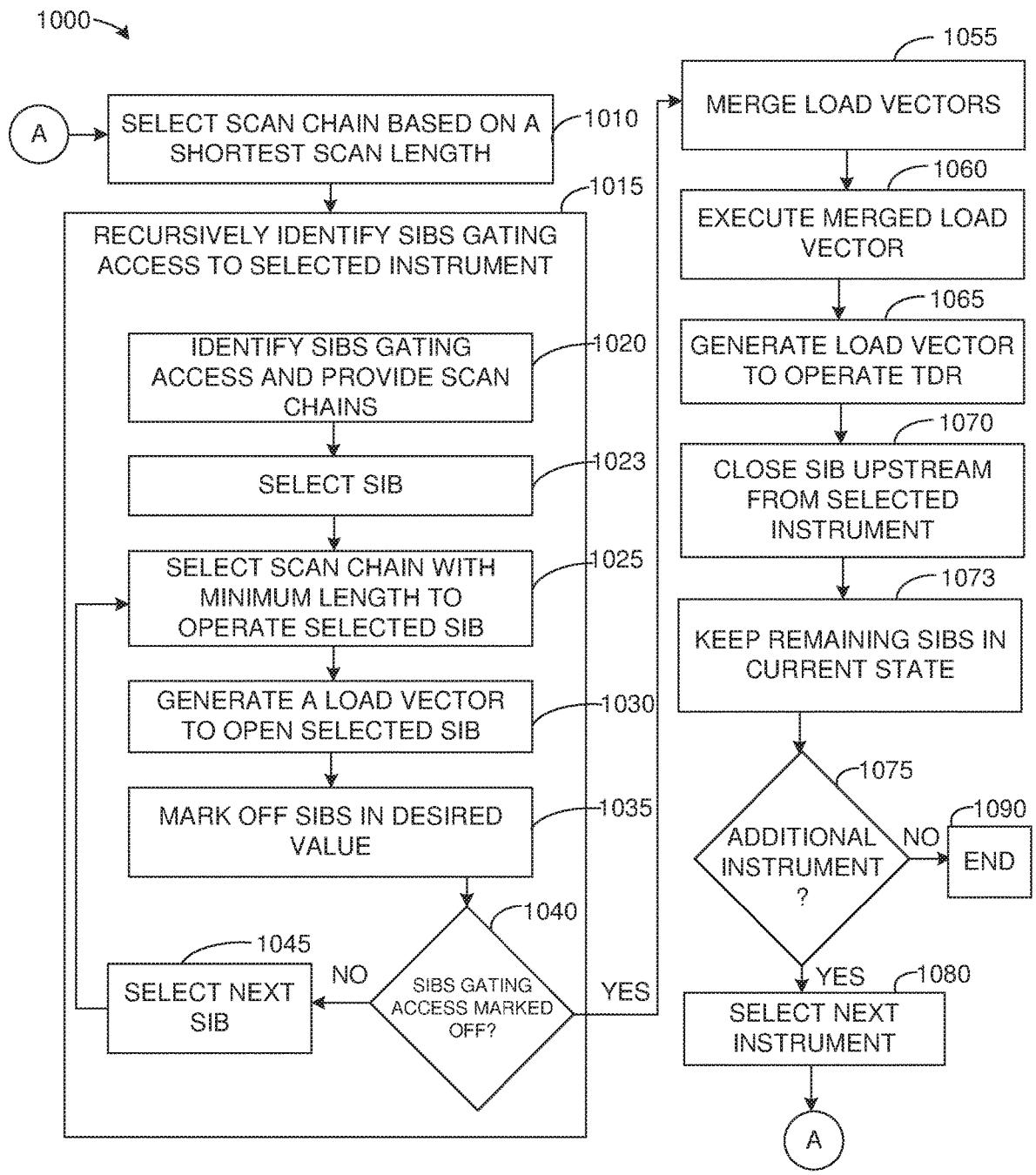
FIG. 10 illustrates a flowchart of an example method for implementing a third testing algorithm on an IC design.

FIG. 10 illustrates a flowchart of an example method 1000 for executing the third test algorithm described with respect to the method 700 of FIG. 7 for a selected instrument. The method 1000 can be executed by an IC chip test engine, such as the IC chip test engine 150 of FIG. 1. As noted, the third test algorithm can be selected by the IC chip test engine in situations where an instrument access script indicates that one or more test patterns are needed to test a selected IP block, and architecture data for an IC design (e.g., the IC design 102 of FIG. 1) indicates that the selected instrument has multiple gating SIBs, which indicates that the selected instrument is accessible via a furthest downstream SIB gating access to the selected instrument is a nested SIB (e.g., a deepest nested SIB). At 1010, the IC chip test engine examines the architecture data to identify SIBs gating access to the selected instrument.

At 1015, the IC chip test engine executes a sub-method to recursively identifies SIBs gating access to the SIB upstream from the selected instrument that are needed for current preconditioning. To execute the sub-method 1015, at 1020, the IC chip test engine identifies SIBs that are gating access to the selected instrument and provide scan chains to operate the SIBs gating access to the selected instrument. At 1023, a SIB gating access to the selected instrument is selected. At 1025 of the sub-method 1015, the IC chip test engine selects the scan chain of the provided scan chains with a shortest length to operate the selected SIB. At 1030 of the sub-method 1015, the IC chip test engine generates a load vector to transition the selected SIB to the opened state. At 1035, the IC chip test engine marks off SIBs gating access to the selected instrument that are set to a desired value. At 1040 of the sub-method 1015, the IC chip test engine makes a determination as to whether the SIBs gating access to the selected instrument are each in the desired value. If the determination is negative (e.g., NO), the sub-method 1015 proceeds to 1045. If the determination at 1040 is positive (e.g., YES), the sub-method 1015 ends and the method 1000 proceeds to 1050. At 1045, a next SIB is selected and the sub-method 1015 returns to 1025. In this manner, the sub-method 1015 provides a set of load vectors to operate the SIBs gating access to the selected instrument.

At 1055, the set of load vectors are merged in a manner that avoids clashing care bits (e.g., control bits or data bits) in the load vectors and merges the load vectors in situations where a scan length and a scan chain are the same to generate a merged test vector (or multiple merged test vectors). At 1060, the merged test vector (or multiple merged test vectors) is executed by the IC chip test engine to operate the SIBs gating access to the selected instrument. At 1065, the IC chip test engine generates a load vector to operate a TDR of the selected instrument with desired load data. The operations at 1065 can include generating multiple load vectors in situations where the instrument access script indicates that multiple tests are executed on the selected instrument.

At 1070, the IC chip test engine adds a value to the load vector for the selected instrument to transition the furthest downstream SIB (e.g., deepest nested SIB) gating access to the selected instrument to the closed state. In this manner, the SIB upstream from the selected instrument is transitioned to the closed state automatically after operations of the TDR in the selected instrument are completed. At 1073, the IC chip test engine keeps the remaining SIBs gating access to the selected instrument in their current state (e.g., states not changed). At 1075, the IC chip test engine makes a determination as to whether there any additional instruments in the instruments access script using the same scan chain. If the determination at 1075 is negative (e.g., NO), the method 1000 proceeds to 1090, where the method 1000 ends. If the determination is positive (e.g., YES), the method 1000 proceeds to 1080. At 1080, a next instrument is selected as the selected instrument, and the method returns to 1010 via node A illustrated in the flowchart.

By employing the third test algorithm employed in the method 1000, the number of superfluous transitions of SIBs can be curtailed in situations where multiple SIBs gate access to a given instrument. More particularly, the third test algorithm implemented in the method 1000 merges the transition of multiple SIBs between the opened state and the closed state into a single load vector (where care bits do not clash), such that each of the SIBs gating access to a given selected instrument are part of the same scan chain.

Figure 11:
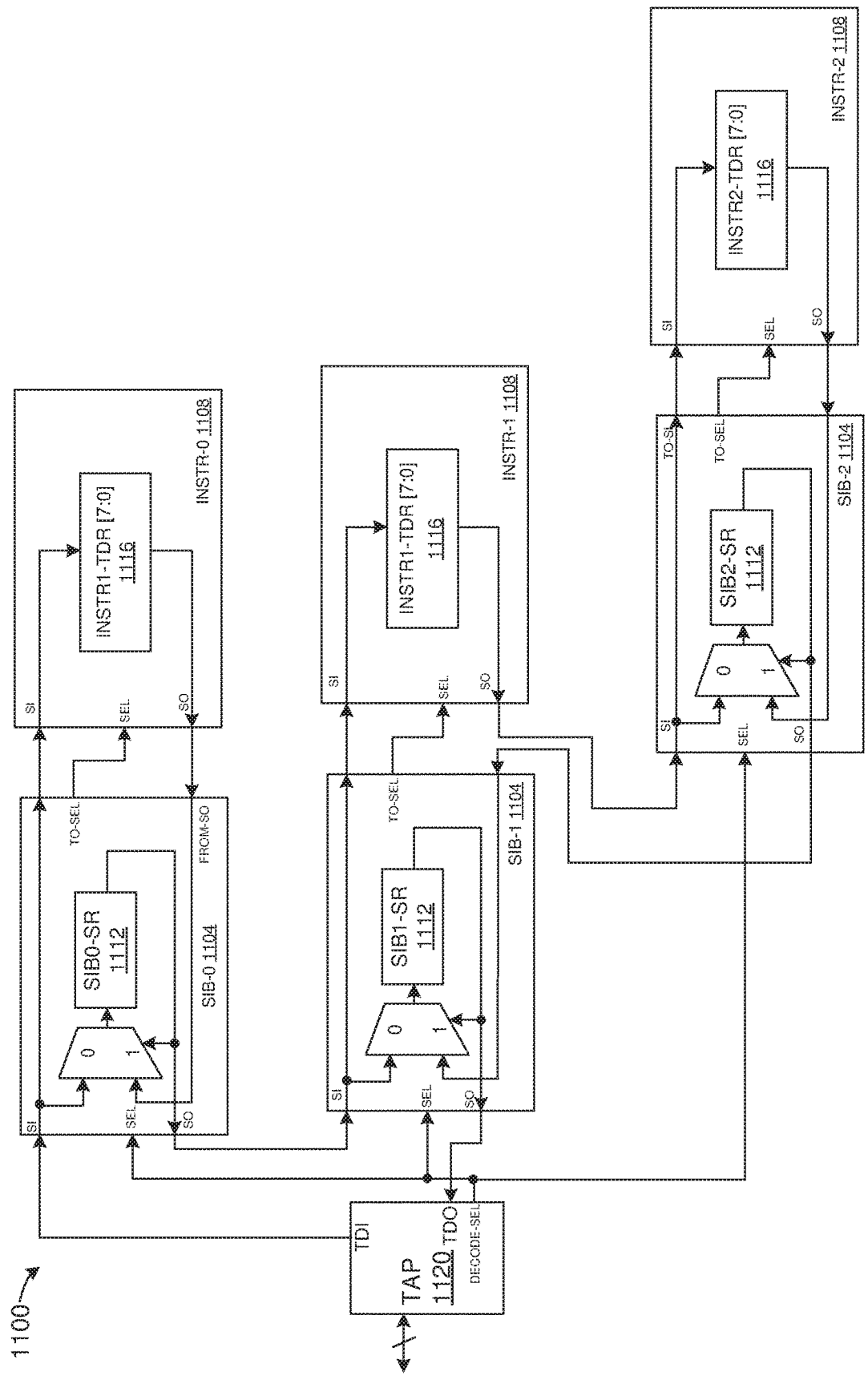
FIG. 11 illustrates a diagram of another IC design with nested SIBs gating access to instruments.

To further demonstrate the third test algorithm, FIG. 11 illustrates an example of an IC chip 1100 with three SIBs 1104, namely SIB 0-1104, SIB 1-1104 and SIB 2-1104. The SIBs 1104 are arranges in a topology such that SIB 2-1104 is nested within SIB-1 1104, such that SIB-1 1104 gates access to SIB-2 1104. Each SIB 1104 gates access to a respective downstream instrument 1108. More particularly, SIB-0 1104 gates access to instrument-0 1108, SIB-1 1104 gates access to instrument-1 1108 and SIB-2 1104 gates access to instrument-2 1104.

Each SIB 1104 includes a scan register 1112. More particularly, SIB-0 1104 includes a scan register, SIB0-SR 1112, SIB-1 1104 includes a scan register, SIB-1-SR 1112 and SIB-2 1104 includes a scan register, SIB2-SR 1112. Each instrument 1108 can be employed to implement an instance of the instrument 136 of FIG. 1. Thus, each instrument 1108 includes a TDR 1116. Each TDR 1116 can be implemented as an 8-bit register.

Moreover, a TAP 1120 provides a select signal, SEL to each of the SIBs 1104. Additionally, a TDI port of the TAP 1120 is provided to a scan in pin, labeled "SI" of the SIB-0 1104. A scan out pin, label "SO" of SIB-1 1104 is coupled to a TDO port of the TAP 1120. Table 6 illustrates a state diagram for the IC chip 1100. In Table 6, a value of '1' for a SIB 1104 indicates that the respective SIB 1104 is in the opened state, and a value of '0' for a SIB 1104 indicates that the respective SIB 1104 is in the closed state. Additionally, in Table 6, a value '1' for the other components indicates that the respective component is accessible based on the state of the SIBs 1104 and a value of '0' indicates that the respective component is not accessible based on the state of the SIBs 1104.

TABLE 6

| CIRCUIT STATE | SIB-0 | SIB-1 | SIB-2 | SIB0-SR | SIB1-SR | SIB2-SR | INSTR0-TDR | INSTR1-TDR | INSTR2-TDR | SCAN LENGTH |
|---|---|---|---|---|---|---|---|---|---|---|
| 1 | 0 | 0 | 0 | 1 | 1 | 0 | 0 | 0 | 0 | 2 |
| 2 | 1 | 0 | 0 | 1 | 1 | 0 | 1 | 0 | 0 | 10 |
| 3 | 0 | 1 | 0 | 1 | 1 | 1 | 0 | 1 | 0 | 19 |
| 4 | 0 | 0 | 1 | | | | INVALID | | | |
| 5 | 1 | 1 | 0 | 1 | 1 | 1 | 1 | 1 | 0 | 27 |
| 6 | 0 | 1 | 1 | 1 | 1 | 1 | 0 | 1 | 1 | 27 |
| 7 | 1 | 0 | 1 | | | | INVALID | | | |
| 8 | 1 | 1 | 1 | 1 | 1 | 1 | 1 | 1 | 1 | 35 |

In the present example, it is presumed that an IC chip test engine (e.g., the IC chip test engine 150 of FIG. 1) employs the third test algorithm to test operations of the IC chip 1100. The third test algorithm is described with respect to FIGS.

1 and 10. In the present example, it is presumed that an instrument access script (e.g., the instrument access script 156 of FIG. 1) includes commands for testing an IP block of instrument-2 1108 and instrument-1 1108.

In such a situation, using the third test algorithm, the IC chip test engine identifies SIB-1 1104 and SIB-2 1104 as gating access to the instrument-2 1108 and identifies SIB-1 1104 as gating access to the instrument 1108. To test the IP block embedded in the instrument-2 1108 the IC chip test engine can designate the instrument-2 1108 as an initial selected instrument. Thus, in such a situation, the IC chip test engine can generate a scan chain that causes the IC chip 1100 to transition to circuit state 6 (since circuit state 6 has a shorter scan length than circuit state 8). Additionally, the IC chip test engine can merge and execute vectors that transitions both SIB-1 1104 and SIB-2 1104 to the opened state.

Additionally, the IC chip test engine can generate a load vector for the TDR 1116 of instrument-2 (e.g., labeled "INSTR2-TDR"). Furthermore, continuing with the present example, the IC chip test engine can add a de-assert value to the load vector that causes the SIB-2 1104 to transition to the closed state upon INSTR2-TDR 1116 completing operations. Further, in the third test algorithm, SIB-1 1104 is kept in the opened state, and instrument-1 1112 is selected as a next selected instrument, and the instrument-1 1112 is tested in a similar manner.

By employing the third test algorithm, in the present example, a superfluous opening and closing of SIBs 1104 is avoided. That is, in the present example, to execute the load vector to test instrument-2 1108, SIB-1 1104 and SIB-2 1104 are transitioned to the opened state once. Moreover, upon completing the test of instrument-2 1108, SIB-2 is automatically transitioned to the closed state (avoiding the need for a separate closing operation) and SIB-1 remains in the opened state, thereby avoiding the need to subsequently re-open SIB-2 to test instrument-1 1108.

Figure 12:
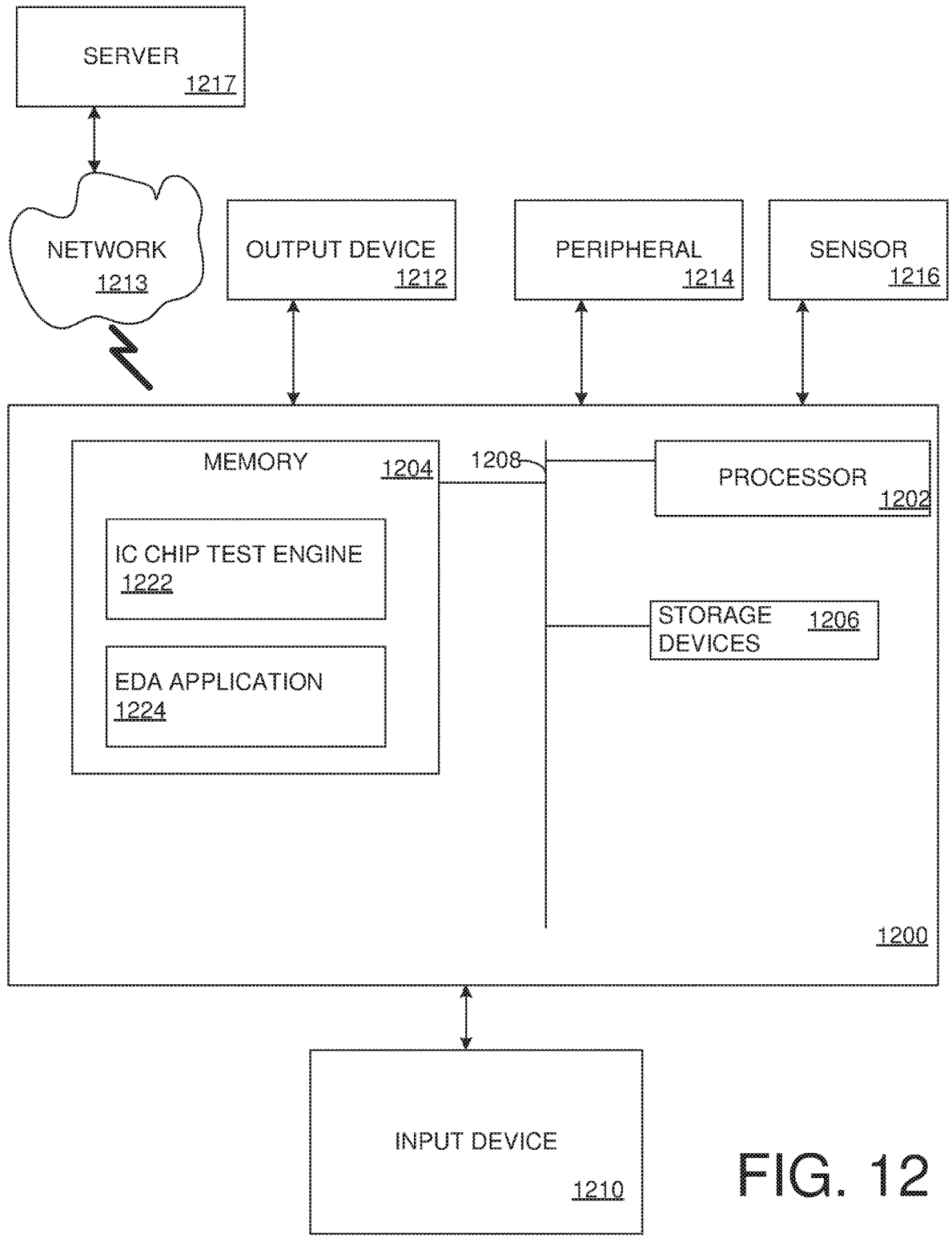
FIG. 12 illustrates an example of a computing system employable to execute an IC chip test engine.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 12, the computing system 1200 can include a computer processor 1202, associated memory 1204 (e.g., RAM), cache memory, flash memory, etc.), one or more storage devices 1206 (e.g., a solid state drive, a hard disk drive, an optical drive such as a compact disk (CD) drive or digital versatile disk (DVD) drive, a flash memory stick, etc.) and numerous other elements and functionalities. The computer processor 1202 may be an IC chip for processing instructions. For example, the computer processor may be one or more cores, or micro-cores of a processor. Components of the computing system 1200 can communicate over a data bus 1208.

The computing system 1200 may also include an input device 1210, such as any combination of one or more of a touchscreen, keyboard, mouse, microphone, touchpad, electronic pen, or any other input device. Further, the computing system 1200 can include an output device 1212, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 1212 can be the same physical device as the input device 1210. In other examples, the output device 1212 and the input device 1210 can be implemented as separate physical devices. The computing system 1200 can be connected to a network 1213 (e.g., LAN, a wide area network (WAN) such as the Internet, a mobile network, or any other type of network) via a network interface connection (not shown). The input device 1210 and output device(s) 1212 can be connected locally and/or remotely (e.g., via the network 1213) to the computer processor 1202, the memory 1204 and/or the storage devices 1206. Many different types of computing systems exist, and the aforementioned input device 1210 and the output device 1212 can take other forms. The computing system 1200 can further include a peripheral 1214 and a sensor 1216 for interacting with the environment of the computing system 1200 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 1200 can communicate with a server 1217 via the network 1213.

The memory 1204 can include an IC chip test engine 1222 to test an IC design that is instantiated as a virtual IC chip operating on a platform provided by an EDA application 1224 or as a fabricated IC chip.

Further, one or more elements of the aforementioned computing system 1200 can be located at a remote location and connected to the other elements over a network 1213. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions, the machine-readable instructions comprising an integrated circuit (IC) chip test engine that:

selects an instrument of an IC design based on an instrument access script, wherein the selected instrument comprises an intellectual property (IP) block and a test data register (TDR) logically arranged upstream from the IP block;
identifies a set of segment insertion bits (SIBs) gating access to the selected instrument;
selects a scan chain for operating the set of SIBs to control access to the selected instrument;
augments the scan chain with data to cause at least a furthest downstream SIB of the set of SIBs that gates access to the selected instrument to transition to an opened state; and
generates a set of load vectors for the scan chain to load the TDR of the selected instrument with data to apply a respective test pattern of a plurality of test patterns to the IP block of the selected instrument, wherein a last load vector of the set of load vectors includes a respective test pattern of the plurality of test patterns and data to transition the furthest downstream SIB of the set of SIBs that gates access to the selected instrument to a closed state, such that the furthest downstream SIB is loaded with a command to transition to the closed state before completion of loading the respective test pattern of the last load vector in the TDR of the selected instrument.

2. The medium of claim 1, wherein the scan chain selected for operating the set of SIBs is a shortest scan chain for operating the set of SIBs.

3. The medium of claim 1, wherein a given load vector in the set of load vectors causes a TDR of another instrument to pass a test pattern to the TDR of the selected instrument.

4. The medium of claim 1, wherein the set of SIBs is a single SIB.

5. The medium of claim 4, wherein the set of load vectors comprises a plurality of load vectors for applying multiple test patterns on the IP block of the selected instrument.

6. The medium of claim 5, wherein the set of load vectors comprises a plurality of load vectors, and each load vector embeds a respective test pattern of the plurality of test patterns, and each of the plurality of test patterns are stored in a cache database.

7. The medium of claim 1, wherein the set of SIBs comprises a plurality of nested SIBS, and the scan chain causes two or more of the plurality of nested SIBs to transition to the opened state.

8. The medium of claim 7, wherein the last load vector keeps a subset of the plurality of nested SIBs that gate access to the furthest downstream SIB of the set of SIBs gating access to the selected instrument in the opened state.

9. The medium of claim 8, wherein the IC chip test engine changes the selected instrument from a first instrument to a second instrument after the last load vector has been executed.

10. The medium of claim 1, wherein an electronic design automation (EDA) application that simulates operation of an IC chip with the IC design interfaces with the IC chip test engine to test the IC chip simulated by the EDA application.

11. The medium of claim 1, wherein the IC chip test engine interfaces with automatic test equipment (ATE) that is coupled to a fabricated IC chip based on the IC design and the IC chip test engine provides signals to a test access port (TAP) of the fabricated IC chip to test the fabricated IC chip.

12. The medium of claim 11, wherein the test pattern of each respective set of load vectors comprises commands in the procedural description language (PDL).

13. A system comprising:
a non-transitory memory that stores machine-readable instructions; and
a processing unit that accesses the memory and executes the machine-readable instructions, the machine-readable instructions comprising an integrated circuit (IC) chip test engine that:
selects an instrument of an IC design based on an instrument access script, wherein the selected instrument comprises an intellectual property (IP) block and a test data register (TDR) logically arranged upstream from the IP block;
identifies a set of segment insertion bits (SIBs) gating access to the selected instrument;
selects a scan chain for operating the set of SIBs to control access to the selected instrument;
augments the scan chain with data to cause at least a furthest downstream SIB of the set of SIBs that gates access to the selected instrument to transition to an opened state; and
generates a set of load vectors for the scan chain to load the TDR of the selected instrument with data to apply a respective test pattern of a plurality of test patterns to the IP block of the selected instrument, wherein a last load vector of the set of load vectors includes a respective test pattern of the plurality of test patterns and data to transition the furthest downstream SIB of the set of SIBs that gates access to the selected instrument to a closed state, such that the furthest downstream SIB is loaded with a command to transition to the closed state before completion of loading the respective test pattern of the last load vector in the TDR of the selected instrument.

14. The system of claim 13, wherein the scan chain selected for operating the set of SIBs is a shortest scan chain for operating the set of SIBs.

15. The system of claim 14, wherein the set of load vectors comprises a plurality of load vectors for applying multiple test patterns on the IP block of the selected instrument.

16. The system of claim 13, wherein the set of SIBs comprises a plurality of nested SIBs, and wherein the scan chain causes two or more of the plurality of nested SIBs to transition to the opened state and the last load vector keeps a subset of the plurality of nested SIBs that gate access to the furthest downstream SIB gating access to the selected instrument in the opened state.

17. A method for testing an integrated circuit (IC) chip implemented by an IC chip test engine executing on a computing platform, the method comprising:
selecting a test algorithm based on architecture data characterizing a layout of an IC chip corresponding to an IC chip design and instrument access script characterizing operations executed during a test of the IC chip corresponding to the IC design;
selecting an instrument in the IC design for testing, the selected instrument comprising an intellectual property (IP) block and a test data register (TDR) logically arranged upstream from the IP block;
selecting a scan chain for operating a set of SIBs to control access to the selected instrument;
augmenting the scan chain with data to cause at least a furthest downstream SIB of the set of SIBs that gates access to the selected instrument to transition to an opened state;
generating a set of load vectors for the scan chain to load the TDR of the selected instrument with data to apply a respective test pattern of a plurality of test patterns to the IP block of the selected instrument, wherein a last load vector of the set of load vectors includes a respective test pattern of the plurality of test patterns and data to transition the furthest downstream SIB of the set of SIBs that gates access to the selected instrument to a closed state, such that the furthest downstream SIB is loaded with a command to transition to the closed state before completion of loading the respective test pattern of the last load vector in the TDR of the selected instrument; and executing the scan chain to test the IC chip corresponding to the IC design.

18. The method of claim 17, wherein a given load vector in the set of load vectors causes a TDR of another instrument to pass a test pattern to the TDR of the selected instrument.

19. The method of claim 17, wherein the set of load vectors comprises a plurality of load vectors for applying multiple test patterns on the IP block of the selected instrument.

20. The method of claim 17, wherein the set of SIBs comprises a plurality of nested SIBs, and wherein the scan chain transitions two or more of the plurality of nested SIBs to the opened state and the last load vector keeps a subset of the plurality of nested SIBs that gate access to the furthest downstream SIB gating access to the selected instrument in the opened state.

* * * * *